United States Patent
Iwai

(10) Patent No.: US 10,049,333 B2
(45) Date of Patent: Aug. 14, 2018

(54) SALES CLERK OPERATION MANAGEMENT APPARATUS, SALES CLERK OPERATION MANAGEMENT SYSTEM, AND SALES CLERK OPERATION MANAGEMENT METHOD

(71) Applicant: PANASONIC INTELLECTUAL PROPERTY MANAGEMENT CO., LTD., Osaka (JP)

(72) Inventor: Kazuhiko Iwai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 536 days.

(21) Appl. No.: 14/606,466

(22) Filed: Jan. 27, 2015

(65) Prior Publication Data
US 2015/0213396 A1     Jul. 30, 2015

(30) Foreign Application Priority Data
Jan. 29, 2014   (JP) ................. 2014-013996

(51) Int. Cl.
G06Q 10/06     (2012.01)
G06K 9/00      (2006.01)

(52) U.S. Cl.
CPC . *G06Q 10/063114* (2013.01); *G06K 9/00771* (2013.01)

(58) Field of Classification Search
None
See application file for complete search history.

(56) References Cited

U.S. PATENT DOCUMENTS 5,918,226 A * 6/1999 Tarumi ............... G06Q 10/10
6,092,048 A * 7/2000 Nakaoka ........... G06Q 10/0631
                                                    705/7.12

(Continued)

FOREIGN PATENT DOCUMENTS

EP    0841627 A2 *  5/1998  ......... G06Q 10/0631
EP    1881698 A2 *  1/2008  ............. H04N 5/772

(Continued)

OTHER PUBLICATIONS

Alonso, Gustavo, et al. "Functionality and limitations of current workflow management systems." IEEE expert 12.5 (1997): 105-111. (Year: 1997).*

(Continued)

*Primary Examiner* — Thomas L Mansfield
*Assistant Examiner* — Derick J Holzmacher
(74) *Attorney, Agent, or Firm* — Greenblum & Bernstein, P.L.C.

(57) ABSTRACT

Provided is a sales clerk operation management apparatus including: an operation contents setter which sets operation contents of each operation executed by the sales clerk; an operation schedule setter which sets the operation schedule relating to each operation set by the operation contents setter; an operation detector which detects that the sales clerk has performed each operation with the set operation contents, based on the image; an execution information generator which generates information relating to the execution situations for each operation condition set in the operation schedule, based on the detected result of the operation detector; and a display information generator which generates and outputs display information showing the information relating to the execution situations for each operation condition generated by the execution information generator to be compared with the operation schedule.

6 Claims, 14 Drawing Sheets

(56) References Cited

U.S. PATENT DOCUMENTS

| | | | |
|---|---|---|---|
| 6,493,675 B1* | 12/2002 | Kanaya | G06Q 10/06316 705/7.26 |
| 6,578,006 B1* | 6/2003 | Saito | G06Q 10/04 705/7.17 |
| 6,925,603 B1* | 8/2005 | Naito | G06Q 10/109 715/733 |
| 7,551,755 B1* | 6/2009 | Steinberg | G06K 9/00228 340/5.53 |
| 8,184,860 B2* | 5/2012 | Muramatsu | H04N 5/772 382/103 |
| 8,918,327 B2 | 12/2014 | Hirakawa et al. | |
| 2001/0027406 A1* | 10/2001 | Araki | G06Q 10/06311 705/7.16 |
| 2005/0246039 A1* | 11/2005 | Iino | G05B 13/042 700/29 |
| 2007/0247321 A1* | 10/2007 | Okamoto | G06Q 10/08 340/573.1 |
| 2007/0249367 A1* | 10/2007 | Sato | G06F 17/3087 455/456.3 |
| 2008/0096611 A1* | 4/2008 | Lee | G06F 3/0481 455/566 |
| 2009/0017764 A1 | 1/2009 | Bonner et al. | |
| 2009/0017779 A1 | 1/2009 | Bonner et al. | |
| 2009/0018927 A1 | 1/2009 | Bonner et al. | |
| 2009/0052747 A1* | 2/2009 | Kamiyama | H04N 7/181 382/118 |
| 2009/0179753 A1 | 7/2009 | Bonner et al. | |
| 2009/0204470 A1* | 8/2009 | Weyl | G06Q 10/06 705/7.13 |
| 2009/0224977 A1 | 9/2009 | Bonner et al. | |
| 2009/0240571 A1 | 9/2009 | Bonner et al. | |
| 2009/0265210 A1 | 10/2009 | Bonner et al. | |
| 2009/0313089 A1 | 12/2009 | Bonner et al. | |
| 2010/0049594 A1 | 2/2010 | Bonner et al. | |
| 2010/0057541 A1 | 3/2010 | Bonner et al. | |
| 2010/0109839 A1 | 5/2010 | Bonner et al. | |
| 2010/0136918 A1 | 6/2010 | Bonner et al. | |
| 2010/0198701 A1 | 8/2010 | Bonner et al. | |
| 2010/0262513 A1 | 10/2010 | Bonner et al. | |
| 2011/0106624 A1 | 5/2011 | Bonner et al. | |
| 2011/0145088 A1 | 6/2011 | Bonner et al. | |
| 2011/0208470 A1* | 8/2011 | Yasuda | G06F 11/3668 702/123 |
| 2011/0248083 A1 | 10/2011 | Bonner et al. | |
| 2012/0114176 A1* | 5/2012 | Kawano | G06K 9/00771 382/103 |
| 2012/0180103 A1* | 7/2012 | Weik, III | G06Q 10/00 726/1 |
| 2012/0209741 A1 | 8/2012 | Bonner et al. | |
| 2012/0245974 A1 | 9/2012 | Bonner et al. | |
| 2012/0304060 A1* | 11/2012 | Kompalli | G06K 9/00 715/709 |
| 2013/0010095 A1* | 1/2013 | Aoki | G06K 9/00268 348/77 |
| 2013/0030875 A1* | 1/2013 | Lee | G06Q 10/06311 705/7.38 |
| 2013/0070973 A1* | 3/2013 | Saito | G06K 9/00228 382/118 |
| 2013/0222586 A1* | 8/2013 | Golan | G06K 9/00771 348/143 |
| 2013/0248593 A1 | 9/2013 | Bonner et al. | |
| 2013/0329950 A1* | 12/2013 | Yang | G06K 9/62 382/103 |
| 2014/0100769 A1* | 4/2014 | Wurman | G06Q 10/087 701/301 |
| 2014/0161316 A1* | 6/2014 | Golan | G06O 30/0201 382/103 |
| 2014/0214484 A1 | 7/2014 | Hirakawa et al. | |
| 2014/0222501 A1* | 8/2014 | Hirakawa | G06Q 30/0201 705/7.29 |
| 2014/0222629 A1* | 8/2014 | Hirakawa | G06Q 10/087 705/28 |
| 2014/0358639 A1 | 12/2014 | Takemoto et al. | |

FOREIGN PATENT DOCUMENTS

| | | | | |
|---|---|---|---|---|
| EP | 3147864 A2 * | 3/2017 | | H04N 5/247 |
| JP | 2000-305996 | 11/2000 | | |
| JP | 2000305996 A * | 11/2000 | | |
| JP | 2002-366621 | 12/2002 | | |
| JP | 2003-331097 | 11/2003 | | |
| JP | 2004-266623 | 9/2004 | | |
| JP | 2004266623 A * | 9/2004 | | |
| JP | 2008-040791 | 2/2008 | | |
| JP | 2008040791 A * | 2/2008 | | |
| JP | 2008-201569 | 9/2008 | | |
| JP | 2011-518394 | 6/2011 | | |
| JP | 2012-003649 | 1/2012 | | |
| JP | 2013-029986 | 2/2013 | | |
| JP | EP 3147864 A2 * | 3/2017 | | H04N 5/247 |
| WO | WO 0161552 A2 * | 8/2001 | | G06Q 10/10 |
| WO | WO-2006054598 A1 * | 5/2006 | | G06K 9/00281 |
| WO | WO 2009131678 A2 * | 10/2009 | | G06Q 10/06 |
| WO | WO-2009131678 A2 * | 10/2009 | | G06Q 10/06 |

OTHER PUBLICATIONS

Aberer, Karl, and Wolfgang Klas. "Supporting Temporal Multimedia Operations in Object-Oriented Database Systems." ICMCS. 1994. (Year: 1994).*

Brass, Marcel, Harold Bekkering, and Wolfgang Prinz. "Movement observation affects movement execution in a simple response task." Acta psychologica 106.1-2 (2001): 3-22. (Year: 2001).*

U.S. Appl. No. 14/529,226 to Tetsurou Kakizawa et al., filed Oct. 31, 2014.

* cited by examiner

SALES CLERK OPERATION MANAGEMENT APPARATUS, SALES CLERK OPERATION MANAGEMENT SYSTEM, AND SALES CLERK OPERATION MANAGEMENT METHOD

TECHNICAL FIELD

The present invention relates to a sales clerk operation management apparatus, a sales clerk operation management system, and a sales clerk operation management method which manage an execution situation of an operation of sales clerk based on an image obtained by imaging the inside of a store.

BACKGROUND OF THE INVENTION

In a store such as a convenience store, it is important to cause a sales clerk to execute an operation according to operation schedules including various determined operations. For example, if an operation regarding cooking in the store or a stocking operation of replenishing a display shelf with products is delayed, this leads to loss of sales opportunities. If an operation regarding a service at a cash register or toilet cleaning is neglected, this leads to a decrease in customer satisfaction. Therefore, it is desirable to perform schedule management for determining suitability of execution of the operations by the sales clerks, that is, whether or not the sales clerks appropriately execute the operations according to the operation schedules.

In a franchise system, a supervisor belonging to a head office which generally manages a plurality of stores performs an instruction or supports the stores while visiting the stores, and this supervisor performs an operation regarding a sales clerk operation management of managing an execution situation of an operation performed by a sales clerk, but there is a limitation on the number of stores the supervisor can visit in a day. Thus, when it is possible to perform the operation regarding the sales clerk operation management in the head office, it is effective in a viewpoint of efficiency of the operation.

Japanese Patent Unexamined Publication No. 2002-366621 discloses a technology of installing a security camera or a microphone in a store, generating information regarding a situation of the store or sales clerks based on an image obtained from the security camera or a voice obtained from the microphone, and transmitting this information to a terminal of the head office. Japanese Patent Unexamined Publication No. 2004-266623 discloses a technology of detecting occurrence of a predetermined event from the image obtained from the security camera and displaying information indicating an occurrence situation of the predetermined event.

SUMMARY OF THE INVENTION

A sales clerk operation management apparatus according to an embodiment of the invention manages an execution situation of an operation performed by a sales clerk, based on an image obtained by imaging the inside of a store. The sales clerk operation management apparatus includes an operation contents setter which sets operation contents of each operation executed by a sales clerk, an operation schedule setter which sets an operation schedule regarding each operation set by the operation contents setter, an operation detector which detects that the sales clerk has performed each operation having the set operation contents based on the image, an execution information generator which generates information regarding an execution situation for each operation condition set in the operation schedule, based on the detected result of the operation detector, and a display information generator which generates and outputs display information that is shown so as to compare the information regarding the execution situation for each operation condition generated by the execution information generator with the operation schedule.

DETAILED DESCRIPTION OF THE PREFERRED EMBODIMENTS

Figure 1:
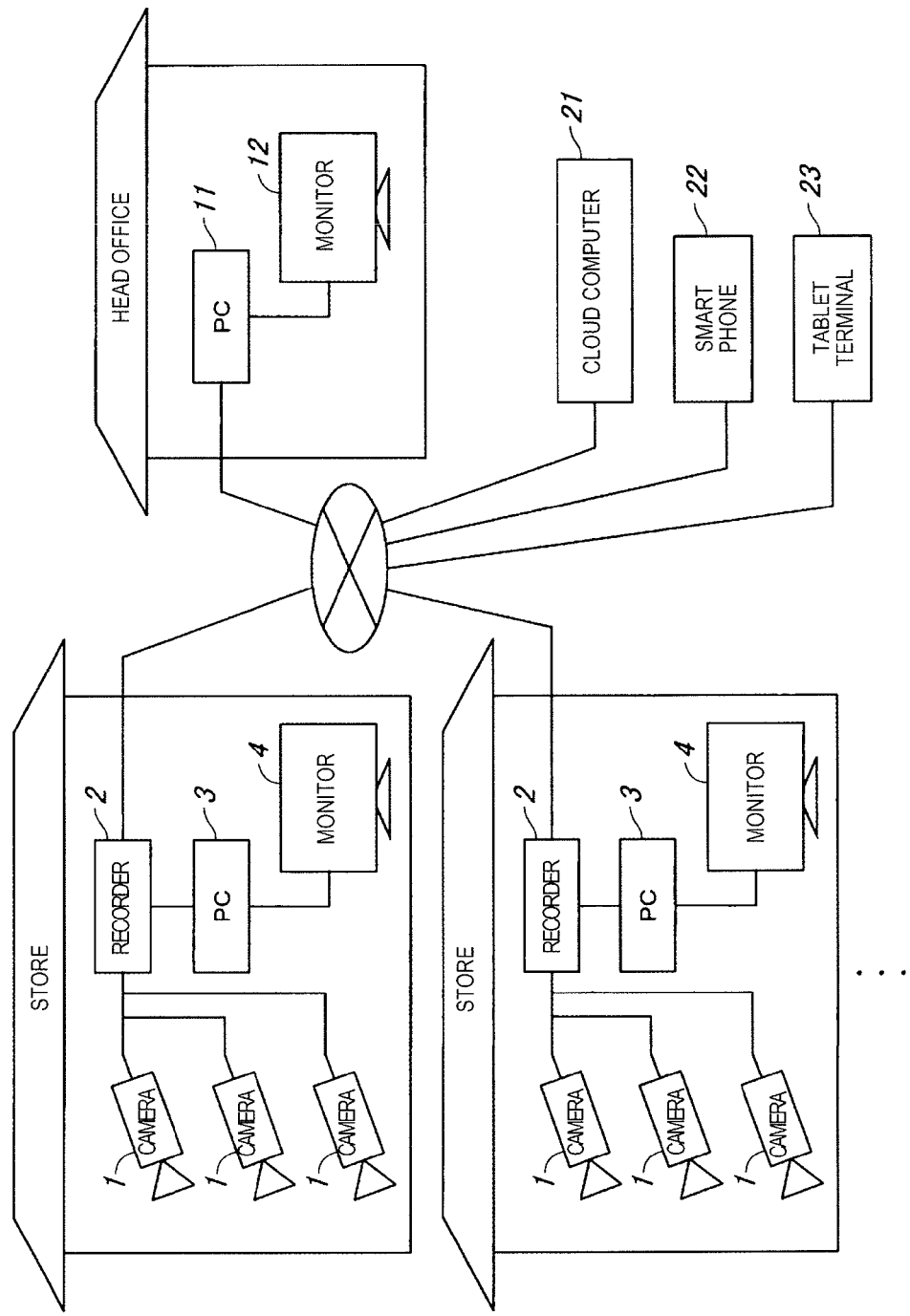
FIG. 1 is an overall configuration diagram of a sales clerk operation management system according to the embodiment.

A sales clerk operation management apparatus according to an embodiment of the invention manages an execution situation of an operation performed by a sales clerk, based on an image obtained by imaging the inside of a store. The sales clerk operation management apparatus includes an operation contents setter which sets operation contents of each operation executed by a sales clerk, an operation schedule setter which sets an operation schedule regarding each operation set by the operation contents setter, an operation detector which detects that the sales clerk has performed each operation having the set operation contents based on the image, an execution information generator which generates information regarding an execution situation for each operation condition set in the operation schedule, based on the detected result of the operation detector, and a display information generator which generates and outputs display information that is shown so as to compare the information regarding the execution situation for each operation condition generated by the execution information generator with the operation schedule.

In this case, the display information which is shown so as to compare the information regarding the execution situation of the operation with the operation schedule is output, and therefore, it is possible for a user to simply grasp whether or not the sales clerks appropriately execute the operations according to the operation schedules.

In the sales clerk operation management apparatus according to the embodiment of the invention, the operation contents setter sets monitoring areas in the store for each operation item, and the operation detector detects the sales clerks from an image of the monitoring areas and detects that the sales clerk has performed the operation, based on a stay situation of the sales clerk in the monitoring area.

In this case, since the operation areas where the sales clerk performs the operation may be different from each other in many cases, the monitoring area corresponding to the operation area is set for each operation item to obtain the stay situation of the sales clerk in the monitoring area, and accordingly, it is possible to detect that the sales clerk has performed the predetermined operation simply and with sufficient accuracy, without specific analysis of the behavior of the sales clerk.

In the sales clerk operation management apparatus according to the embodiment of the invention, the operation contents setter sets the monitoring area for each operation item, according to an input operation by a user which is selecting the monitoring area corresponding to the operation item among candidates of the preset monitoring areas.

In this case, it is easy for a user to perform the operation when setting the monitoring area for each operation item and it is possible to increase convenience to a user.

In the sales clerk operation management apparatus according to the embodiment of the invention, the operation contents setter sets the monitoring area in an access area with respect to the operation area, when the sales clerk performs the operation in an operation area which is not displayed in the image, and the operation detector detects that the sales clerk has performed the operation, based on the events of the sales clerk who disappears and returns to appear in the image obtained by imaging the monitoring area.

In this case, even when it is difficult to obtain the image of the operation area due to a reason that the operation area where the sales clerk performs the operation is not a selling area and it is desired to perform the monitoring without installing the camera or a reason that it is difficult to install the camera in the operation area, it is possible to detect that the sales clerk has performed the operation.

In the sales clerk operation management apparatus according to the embodiment of the invention, the display information generator generates and outputs list display information which displays the execution situation for each operation condition in a target period as a list, and outputs an image showing the operation situation of the sales clerk corresponding to the selected operation condition, according to the operation of a user who selects the operation condition of interest in the list display information.

In this case, it is possible to briefly grasp the execution situation of the operation by the list display information. For the operation conditions of interest, it is possible to check the actual operation situation of the sales clerk with the image. Accordingly, even when the accuracy of the operation detection process performed by the operation detector is low and an erroneous detection occurs, it is possible to accurately grasp the actual operation situation.

In the sales clerk operation management apparatus according to the embodiment of the invention, the display information generator outputs first list display information which displays the execution situation for each operation condition in the target period as a list by time periods, outputs second list display information which displays the execution situation for each operation condition by time zones shorter than those of the first list display information as a list, and outputs the image corresponding to the selected operation condition, according to the operation of a user who selects the operation condition of interest in the second list display information.

In this case, it is possible to display the images by separating in short time zones, and therefore, it is possible to effectively find the image in which the actual operation situation of the sales clerk is imaged.

In the sales clerk operation management apparatus according to the embodiment of the invention, the display information generator generates and outputs display information regarding an execution situation checking screen to be displayed on a display device. The execution situation checking screen is provided with a comment input part into which a user inputs a comment, and another user is notified of the comment input into this comment input part.

In this case, it is possible to transmit the comment from a user (supervisor or the like) on the head office side which generally manages the plurality of stores to a user (store manager or sales clerk) on the store side, and indicate and instruct the improvement matters. A user on the head office side can input the comment while checking the execution situation of the operation, it is possible to efficiently create an appropriate comment, and thus, it is possible to increase the convenience to a user.

In the sales clerk operation management apparatus according to the embodiment of the invention, the execution information generator includes an execution situation evaluator which performs evaluations regarding execution or non-execution of the operation and appropriateness of the execution timing, for each operation condition, by comparison to the detected results of the operation detector and the operation schedule.

In this case, it is possible for a user to simply grasp the execution or non-execution of the operation and appropriateness of the execution timing from the evaluation results obtained by the execution situation evaluator.

In the sales clerk operation management apparatus according to the embodiment of the invention, the execution information generator includes a totalizer which totals the evaluation results for each operation condition obtained by the execution situation evaluator, in each predetermined total unit period, and obtains the evaluation results in each total unit period.

In this case, it is possible to immediately grasp the execution state of the operation in an arbitrary total unit period (for example, a day, a week, and a month).

In the sales clerk operation management apparatus according to the embodiment of the invention, the totalizer obtains the evaluation result for each total unit period from the evaluation result for each operation condition, according to the order of priority applied to the evaluation results in the order of a high degree of unsuitability, when the plurality of operation conditions are in the total unit period.

In this case, the evaluation result of the operation condition having the worst problem among the plurality of operation conditions in one total unit period is set as the evaluation result in the total unit period, and therefore, it is possible to rapidly grasp the period having a problem.

A sales clerk operation management system according to the embodiment of the invention manages execution situations of operations performed by a sales clerk based on an image obtained by imaging the inside of a store. There is provided a sales clerk operation management system including: cameras which image the inside of a store; and a plurality of information processing apparatuses, in which any one of the plurality of information processing apparatuses includes an operation contents setter which sets operation contents of each operation executed by the sales clerk, an operation schedule setter which sets the operation schedule relating to each operation set by the operation contents setter, an operation detector which detects that the sales clerk has performed each operation with the set operation contents, based on the image, an execution information generator which generates information relating to the execution situations for each operation condition set in the operation schedule, based on the detected result of the operation detector, and a display information generator which generates and outputs display information showing the information relating to the execution situations for each operation condition generated by the execution information generator to be compared with the operation schedule.

In this case, it is possible for a user to simply grasp whether or not the sales clerks appropriately execute the operations according to the operation schedules.

A sales clerk operation management method according to the embodiment of the invention causes an information processing apparatus to perform a process of managing execution situations of operations performed by a sales clerk based on an image obtained by imaging the inside of a store. There is provided a sales clerk operation management method including: a step of setting operation contents of each operation executed by the sales clerk; a step of setting the operation schedule relating to each operation set in this step; a step of detecting that the sales clerk has performed each operation with the set operation contents, based on the image; a step of generating information relating to the execution situations for each operation condition set in the operation schedule, based on the detected result in this step; and a step of generating and outputting display information showing the information relating to the execution situations for each operation condition generated in this step to be compared with the operation schedule.

In this case, it is possible for a user to simply grasp whether or not the sales clerks appropriately execute the operations according to the operation schedules.

Hereinafter, the embodiments of the invention will be described with reference to the drawings.

FIG. 1 is an overall configuration diagram of a sales clerk operation management system according to the embodiment. The sales clerk operation management system is built for a chain of retail stores such as convenience stores, and includes camera (imaging device) 1, recorder (image recording device) 2, PC (sales clerk operation management device) 3, and monitor (display device) 4 which are provided in a plurality of stores, and PC 11 and monitor 12 which are provided in a head office which generally manages the plurality of stores.

Cameras 1 are installed in appropriate places in the store, the inside of the store is imaged by cameras 1, and the image obtained is recorded in recorder 2. In PC 3 installed in the store or PC 11 installed in the head office, it is possible to browse the image of the inside of the store imaged by cameras 1 in real time, it is possible to browse the image of the inside of the store in the past recorded in recorder 2, and therefore, it is possible to check the situation in the store, in the store or in the head office.

PC 11 installed in the head office is configured as the sales clerk operation management device which manages the execution situation of the operation performed by the sales clerk. It is possible to browse information generated by PC 11 in PC 11, and it is also possible to browse the information in PC 3 by transmitting the information to PC 3 installed in the store. PC 3 and PC 11 are configured as a browsing device.

Figure 2A:
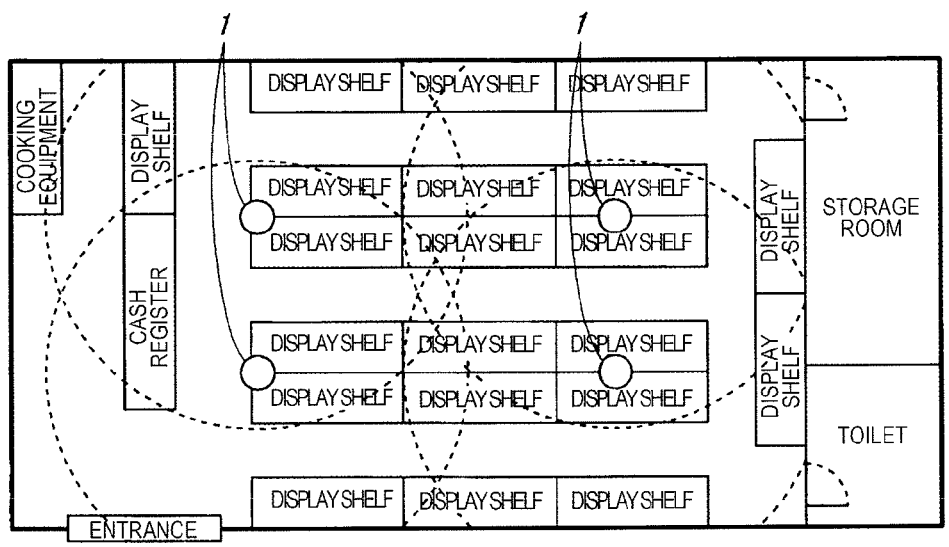
FIG. 2A is a plan view of a store illustrating a layout of the store and an installation situation of cameras 1.
Figure 2B:
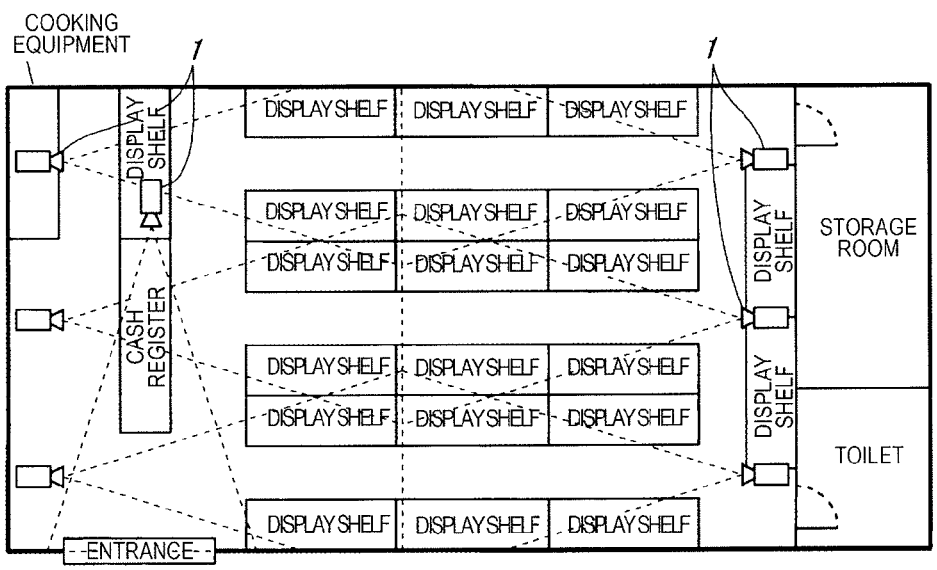
FIG. 2B is a plan view of a store illustrating a layout of the store and an installation situation of cameras 1.

Next, a layout of the store and an installation state of cameras 1 will be described using a convenience store as an example. FIGS. 2A and 2B are plan views of a store illustrating the layout of the store and the installation state of cameras 1.

In the store, an entrance, display shelves, a cash register, and cooking equipment are provided. The display shelves are installed to be divided into types of products such as a lunch box, processed food, snack food, cup noodles, household goods, and the like. The cooking equipment is for cooking a fast food such as a hamburger in the store, and a display shelf for cooked products is installed next to the cash register. A customer enters the store from the entrance, moves in the store through passages between the display shelves, heads for the cash register with a product when a desired product is found, makes a payment at the cash register, and exits the store from the entrance.

A storage room and a toilet are provided in the store, in a state of being separated from the selling area having the display shelves and the cash register provided therein, with a wall. Entrances of the storage room and the toilet are provided at positions facing the selling area, and it is possible to enter and exit from the storage room and the toilet from the entrances.

The plurality of cameras 1 which image the inside of the store are installed in the store. Particularly, in the example shown in FIG. 2A, an omnidirectional camera including an imaging range at 360 degrees using a fisheye lens is employed as camera 1, and in the example shown in FIG. 2B, a camera including a predetermined angle of view that is a so-called box camera is employed as camera 1. These cameras 1 are installed in a ceiling of the selling area with the display shelves and the cash register provided therein, and can image the entire selling area.

Figure 3:
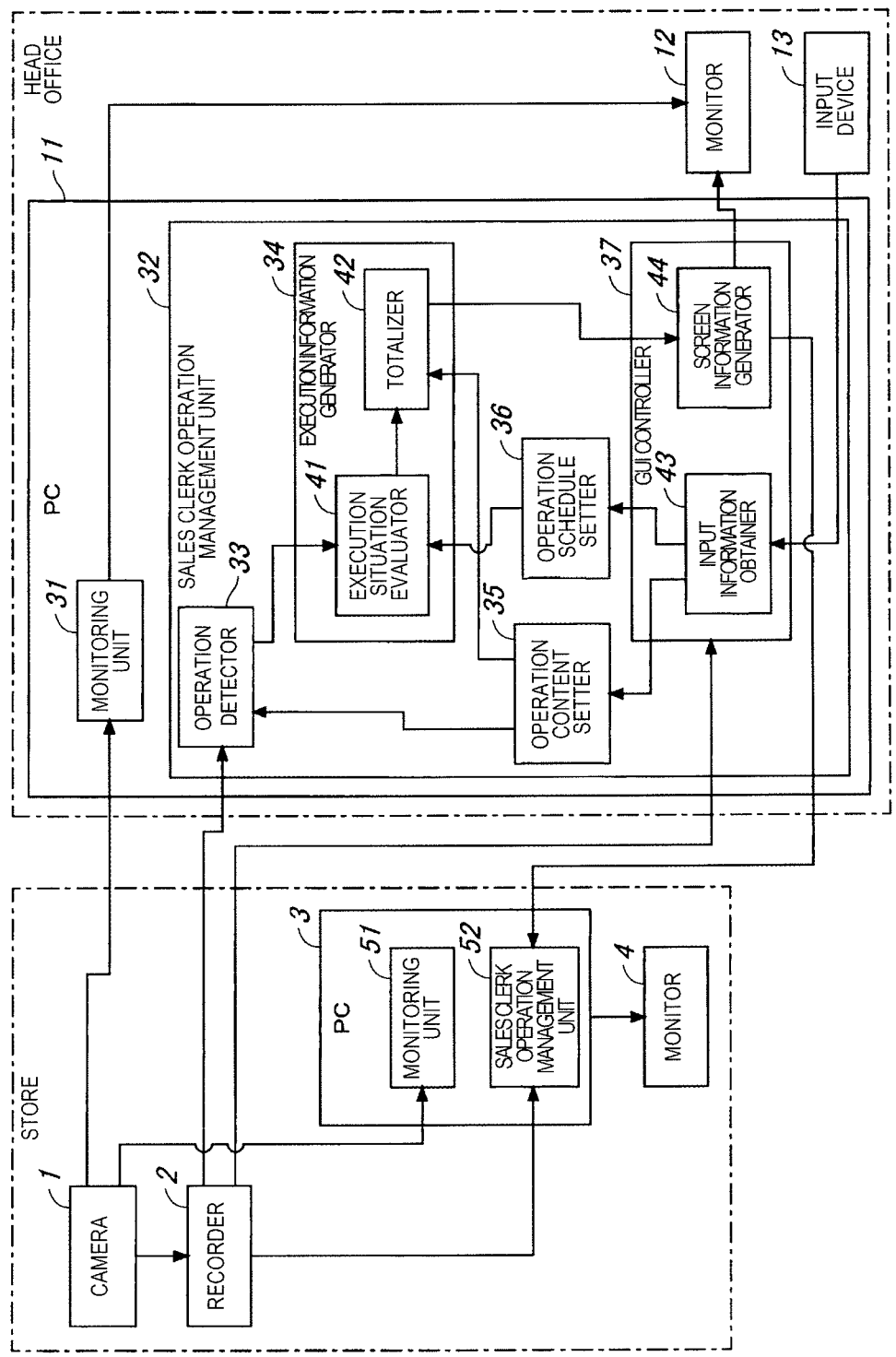
FIG. 3 is a functional block diagram showing a schematic configuration of PC 11 of a head office.

Next, an outline of a sales clerk operation management process performed by PC 11 installed in the head office shown in FIG. 1 will be described. FIG. 3 is a functional block diagram showing a schematic configuration of PC 11 installed in the head office.

PC 11 includes monitoring unit 31 and sales clerk operation management unit 32. Management unit 32 causes PC 11 to function as a monitoring system which monitors the inside of the store. Monitoring unit 31 can control the operations of cameras 1 and recorder 2, can browse the image of the inside of the store imaged by cameras 1 in real time, and can browse the image of the inside of the store recorded by recorder 2.

Sales clerk operation management unit 32 manages an execution situation of an operation performed by a sales clerk, based on the image obtained by imaging the inside of the store by cameras 1, and includes operation detector 33, execution information generator 34, operation content setter 35, operation schedule setter 36, and GUI controller 37.

Operation content setter 35 performs a process of setting the contents of each operation for the sales clerk to execute, that is, setting where and how to perform the operation. This operation content setting process is performed according to an input operation by a user, and a user can freely set the necessary operation.

Operation schedule setter 36 performs a process of setting the operation schedule regarding each operation set by operation content setter 35, that is, setting when to perform each operation. The operation schedule setting process is performed according to an input operation by a user, and a user can freely set the operation. In the operation schedule, the timing (time zone) for executing the operation is determined for each operation item (type), and each operation to be executed according to the operation schedule with the determined timing is appropriately referred to as an "operation condition" in the embodiment.

Operation detector 33 performs a process of detecting that the sales clerk has performed each operation set by operation content setter 35, based on the image of camera 1. The operation detection process will be described in detail later.

Execution information generator 34 generates information regarding the execution situation of the operation, based on the detected results of operation detector 33, and includes execution situation evaluator 41 and totalizer 42.

Execution situation evaluator 41 performs a process of evaluating the execution situation of the operation for each operation condition, by comparing the detected results of operation detector 33 and the operation schedule. In this execution situation evaluation process, the execution and non-execution of the operation and the appropriateness of the execution timing are determined. When the operation is executed in a time zone set in the operation schedule, it is evaluated as proper execution (operation OK), when the operation is executed earlier than the time zone set in the operation schedule, it is evaluated as advanced, when the operation is executed later than the time zone set in the operation schedule, it is evaluated as delayed, and when no operations are executed, it is evaluated as non-execution.

Particularly, in the embodiment, the time zone for executing the operation set in the operation schedule and the time zone for actually performing the operation are compared to each other, and the execution situation of the operation is evaluated according to whether or not the deviation thereof falls in an acceptable range (acceptable time). That is, when the deviation falls in an acceptable range, it is evaluated as proper execution (operation OK), and when the deviation is beyond the acceptable range, it is evaluated as delayed or advanced, according to a time relationship.

Totalizer 42 performs a process of totaling the evaluation result for each operation condition obtained by the execution situation evaluator 41, for each predetermined total unit period (for example, a day, a week, and a month), and obtaining the evaluation result for each total unit period.

Herein, the order of priority is applied to the evaluation results (operation OK, advanced, delayed, and non-execution) in the order of a high degree of unsuitability, that is, in order of non-execution, delayed, advanced, and operation OK. When, the plurality of operation conditions are in the total unit period, totalizer 42 performs a process of generating the evaluation result for each total unit period from the evaluation result for each operation condition, according to the order of priority. That is, among the evaluation results for each of the plurality of operation conditions in the total period, the evaluation result having the highest order of priority is set as the evaluation result in the total unit period.

For example, when there is the operation condition of non-execution, the evaluation result in the total unit period is set as non-evaluation, even when there is another operation condition such as delayed or advanced. In addition, when there is no operation condition of non-execution and there are the operation conditions of delayed and advanced, the evaluation result in the total unit period is set as delayed.

GUI controller 37 performs a process of obtaining input information by an input operation by a user, by a graphical user interface (GUI) using monitor 12 and input device (inputter) 13 such as a mouse, and a process of outputting information generated by execution information generator 34, and includes input information obtainer 43 and screen information generator (display information generator) 44.

Screen information generator 44 performs a process of generating display information regarding a set matter input screen (see FIG. 7) for a user to input a set matter relating to the operation contents for each operation item, a monitoring area selection screen (see FIG. 8) for a user to select the monitoring area for each operation item, an execution situation check screen for a user to check the execution situation of the operation, that is, an overall check display screen (see FIGS. 9 and 12) for displaying the execution states of the operation in the target period as a list, and a detail display screen (see FIGS. 10, 11, and 13) for specifically displaying the execution states of the operation, and displays each screen on monitor 12.

Input information obtainer 43 performs a process of obtaining input information according to an input operation performed by a user on each screen displayed on monitor 12 using input device 13. Based on the input information obtained by input information obtainer 43, operation content setter 35 performs a process of setting the operation contents of each operation and operation schedule setter 36 performs a process of setting the operation schedule.

In the same manner as that of PC 11 installed in the head office, PC 3 installed in each store includes monitoring unit 31 and sales clerk operation management unit 32. Monitoring unit 31 and sales clerk operation management unit 32 of PC 3 may include the same functions as those of monitoring unit 31 and sales clerk operation management unit 32 of PC 11, and particularly sales clerk operation management unit 32 of PC 3 has a function of receiving the information generated by sales clerk operation management unit 32 of PC 11 and displaying the information on monitor 4.

Particularly, in the embodiment, although will be described later, a user on the head office side such as a supervisor can input a comment for indication or instruction of the improvement matter on the screen displayed on monitor 12 in the head office, the comment input on this screen is transmitted to PC 3 in the store and displayed on monitor 4, and accordingly, a user on the store side such as a store manager or a sales clerk can browse the comment.

Monitoring unit 31 and sales clerk operation management unit 32 of PC 11 shown in FIG. 3 include a processor (CPU) and a program memory. The CPU of PC 11 is realized by executing programs (instruction) for monitoring and sales clerk operation management. The programs may be introduced to PC 11 as an information processing apparatus in advance to configure PC as a dedicated apparatus, or may be supplied to a user by being recorded in a suitable program recording medium as an application program to be operated on a general-use OS, or through a network. The configurations of monitoring unit 31 and sales clerk operation management unit 32 of PC 3 are also the same as those of PC 11.

Figure 4:
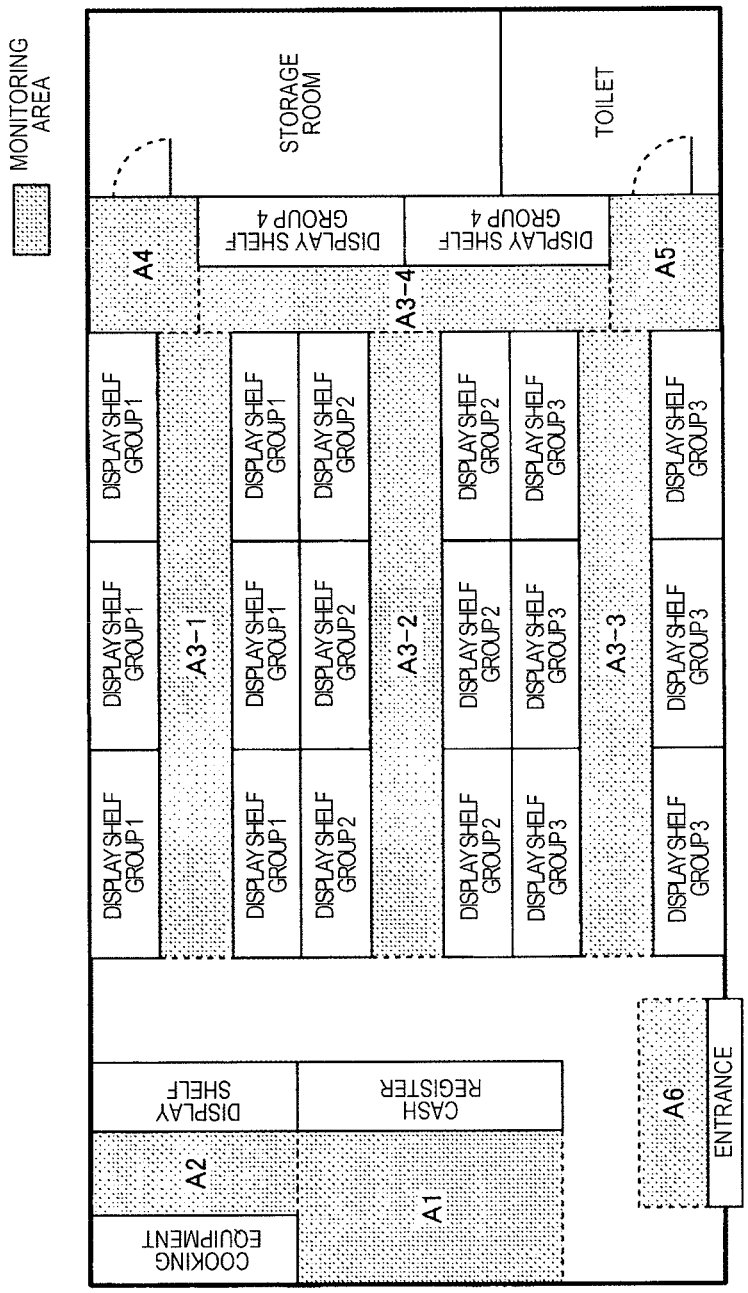
FIG. 4 is an explanatory diagram showing monitoring areas set in a store.

Next, the monitoring areas set by operation content setter 35 for detecting that the sales clerk has performed the predetermined operation by operation detector 33 will be described. FIG. 4 is an explanatory diagram showing the monitoring areas set in the store.

In the embodiment, operation content setter 35 performs a process of setting the monitoring areas in the store for each operation item, and operation detector 33 performs a process of determining whether or not the sales clerk has performed the operation, based on the image obtained by imaging the monitoring areas.

Herein, in the embodiment, as shown in FIG. 2, cameras 1 are installed only in the selling area. Accordingly, when the sales clerk performs the operation in the selling area, that is, when the operation areas where the sales clerk performs the operation are displayed in the images of cameras 1, it is determined whether or not the sales clerk has performed the operation based on the image obtained by imaging the monitoring area, by setting the operation areas as the monitoring areas.

Specifically, the operation regarding the service (payment) at the cash register is performed in the operation area facing the cash register, the operation regarding cooking is performed in the operation area facing the cooking equipment, and these operation situations can be imaged by cameras 1 installed in the selling area. Here, monitoring area A1 relating to the operation regarding the service at the cash register is set in the operation area facing the cash register, and monitoring area A2 relating to the operation regarding the cooking is set in the operation area facing the cooking equipment.

The operations regarding the stocking (replenishing with products) and display arrangement in the store are performed in the passages (operation areas) facing the display shelves, and these operation situations can be imaged by cameras 1 installed in the selling area. Here, monitoring areas A3-1 to A3-4 relating to operations regarding the stocking in the store and the display arrangement are set in the passages facing the display shelves. Herein, the display shelves are divided into groups 1 to 4 by setting the display shelves facing each other with a passage interposed therebetween as one group, and the monitoring areas are selected in the unit of the group.

Meanwhile, when the operation area is other than the selling area, it is difficult to image the operation situation of the sales clerk. That is, in the operation regarding the stocking in the storage room, it is difficult to image the operation situation of the sales clerk, because there is no camera in the storage room which is the operation area. Also, in the operation regarding the toilet cleaning, it is difficult to image the operation situation of the sales clerk, because there is no camera in the toilet which is the operation area. In addition, the operation regarding emptying the garbage is performed at the outside of the store, and it is difficult to image the operation situation of the sales clerk, because there is no camera at the outside of the store.

Meanwhile, the selling area side of the entrance of the storage room, the selling area side of the entrance of the toilet, and the selling area side of the entrance of the store can be imaged by cameras 1 installed in the selling area, and the sales clerk who exits and enters the entrance for performing the operation is imaged on the images of these areas.

Therefore, in the embodiment, when the sales clerk performs the operation in the operation areas which is not displayed in the image of cameras 1, an access area with respect to the operation area, that is, an area where the sales clerk passes through when performing the operation in the operation area, is set as the monitoring area. Specifically, monitoring area A4 relating to the operation regarding the stocking in the storage room is set on the selling side of the entrance of the storage room, monitoring area A5 relating to the operation regarding the toilet cleaning is set on the selling side of the entrance of the toilet, and monitoring area A6 relating to the operation regarding the emptying the garbage is set on the selling side of the entrance of the store.

Figure 5:
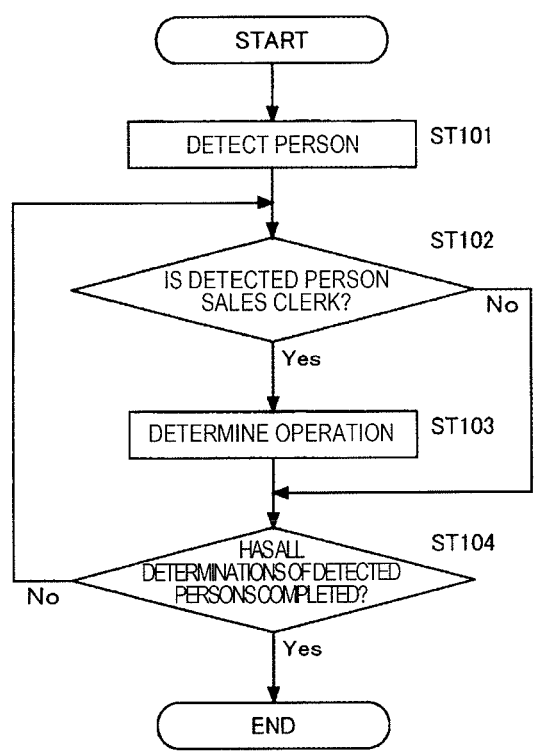
FIG. 5 is a flowchart showing procedures of an operation detection process performed by operation detector 33.

Next, the operation detection process performed by operation detector 33 shown in FIG. 3 will be described. FIG. 5 is a flowchart showing procedures of the operation detection process performed by operation detector 33.

In the operation detection process, first, person detection of detecting a person from the image of camera 1 obtained by imaging the monitoring area is performed (ST101), sales clerk determination of determining whether or not the person detected in the person detection process is a sales clerk is performed (ST102), and, when the detected person is the sales clerk, operation determination of determining whether or not the person has performed the operation is performed (ST103). The sales clerk determination (ST102) and the operation determination (ST103) are repeated until all determinations of the persons detected in the image are completed (ST104).

In the sales clerk determination (ST102), when camera 1 is the omnidirectional camera, it is difficult to image the face of the sales clerk from the front, and accordingly, the sales clerk determination may be performed based on characteristics of clothes. Meanwhile, when camera 1 is the box camera, it is possible to image the face of the sales clerk from the front. Accordingly, it is possible to determine the sales clerk determination face collation, and both of the face collation and the clothes determination may be performed.

Figure 6A:
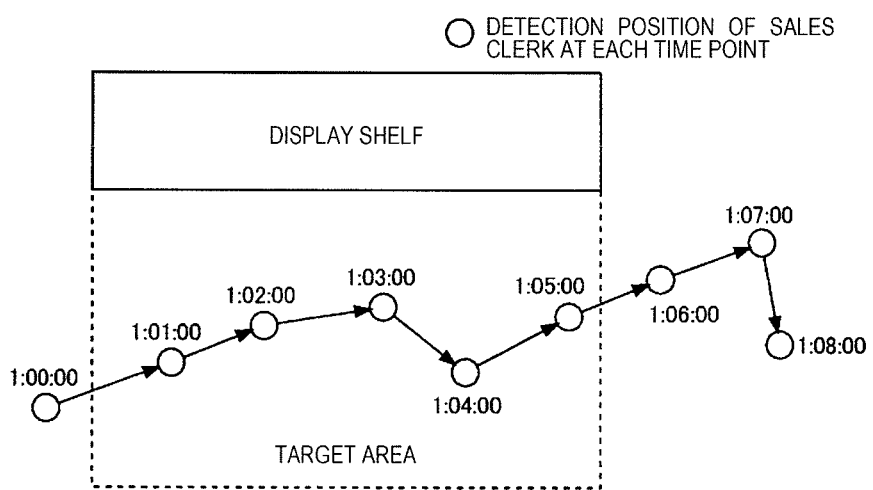
FIG. 6A is an explanatory diagram illustrating points of an operation determination process (ST103 of FIG. 5) performed by operation detector 33.
Figure 6B:
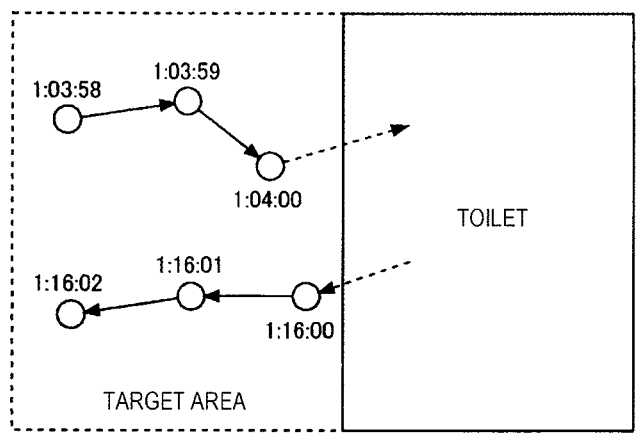
FIG. 6B is an explanatory diagram illustrating points of an operation determination process (ST103 of FIG. 5) performed by operation detector 33.

FIGS. 6A and 6B are explanatory diagrams illustrating points of the operation determination process (ST103 of FIG. 5) performed by operation detector 33.

In the embodiment, operation content setter 35 sets the monitoring area in the store for each operation item, and operation detector 33 detects the sales clerk from the image of the monitoring area and determines whether or not the sales clerk has performed the operation based on the stay situation of the sales clerk in the monitoring area. In this case, as will be described below, a method of determining whether or not the sales clerk has performed the operation is different, when the sales clerk performs the operation in the operation area displayed in the image of camera 1, and when the sales clerk performs the operation in the operation area not displayed in the image of camera 1.

FIG. 6A is a case where the sales clerk performs the operation in the operation area displayed in the image of camera 1. As described above, in each operation such as the service (payment) at the cash register, the cooking, and the stocking and the display arrangement in the store, it is possible to image the operation situations of the sales clerk by camera 1. Accordingly, as shown in FIG. 4, it is determined whether or not the sales clerk has performed the operation based on the image obtained by imaging the monitoring area, by setting the operation area where the sales clerk performs the operation as the monitoring area. The example shown in FIG. 6A is the case of the operation regarding the stocking in the store, and the monitoring area is set in the passage facing the display shelf.

In this case, in the embodiment, it is determined whether or not the sales clerk has performed the operation based on stay time of the sales clerk in the monitoring area. That is, when the sales clerk enters the monitoring area, it is possible to determine the start of the operation by the sales clerk, and when the sales clerk leaves the monitoring area, it is possible to determine the completion of the operation by the sales clerk. The time elapsed from an entering time point when the sales clerk enters the monitoring area (operation starting time point) to a leaving time point when the sales clerk leaves the monitoring area (operation completion time point), that is, the stay time (operation time) in the operation area, is calculated, and it is determined whether or not the sales clerk has performed the operation, by comparing the stay time and an assumed operation time.

The example shown in FIG. 6A is the operation regarding the stocking in the store, and when an assumed operation time of the operation regarding the stocking in the store is set as 20 minutes, it is determined that the sales clerk has not performed the operation regarding the stocking in the store, because the stay time is set as 5 minutes (from 1:01:00 to 1:06:00) in this example.

In the embodiment, it is determined whether or not the sales clerk has performed the operation, based on a movement amount of the sales clerk in the monitoring area. In this case, the movement amount of the sales clerk is obtained by adding distances between the detected positions of the sales clerk at each time point detected in the monitoring area in the human detection process, and it is determined whether or not the sales clerk has performed the operation, by comparing this movement amount and an assumed movement amount.

It may be determined whether or not the sales clerk has performed the operation, based on both the stay time and the movement amount of the sales clerk in the monitoring area, but the determination may be performed by only one of the stay time and the movement amount.

It is also possible to determine whether or not the sales clerk has performed the operation, based on a movement speed of the sales clerk in the monitoring area. In this case, movement speeds between the detected positions of the sales clerk at each time point detected in the monitoring area in the human detection process are obtained, and an average value of the movement speeds is set as the movement speed in the monitoring area. It is also possible to perform the determination by using only the movement speed, but the determination may be performed with a combination with the stay time or the movement amount.

FIG. 6B is a case where the sales clerk performs the operation in the operation area not displayed in the image of camera 1. As described above, in operations regarding the stocking in the storage room, the toilet cleaning, and emptying the garbage, it is difficult to image the operation situations of the sales clerk by camera 1. Accordingly, as shown in FIG. 4, it is determined whether or not the sales clerk has performed the operation based on the image obtained by imaging the monitoring area, by setting the access area with respect to the operation area where the sales clerk performs the operation, as the monitoring area. The example shown in FIG. 6B is the case of the operation regarding the toilet cleaning, and the monitoring area is set on the selling area side of the entrance of the toilet.

In this case, in the embodiment, it is determined whether or not the sales clerk has performed the operation based on the events of the sales clerk who disappears and returns to appear in the image obtained by imaging the monitoring area. That is to say, when the sales clerk disappears from the image of the monitoring area, that is, when the detection of a person who is the sales clerk fails during the human detection, it is possible to determine that the sales clerk has entered the operation area and started the operation. When the sales clerk returns to appear in the image of the monitoring area, that is, when the person who is the sales clerk has appeared again in the person detection, it is possible to determine that the sales clerk has completed the operation and left the operation area. It is possible to determine whether or not the sales clerk has performed the operation by the disappearance event and the returning event.

Particularly, in the embodiment, an time elapsed from an disappearance time point when the disappearance event of the sales clerk has occurred in the monitoring area (operation starting time point) to a returning time point when the returning event of the sales clerk has occurred in the monitoring area (operation completion time point), that is, the stay time (operation time) in the operation area is calculated, and it is determined whether or not the sales clerk has performed the operation, by comparing the stay time and the assumed operation time.

The example shown in FIG. 6B is the operation regarding the toilet cleaning, and when an assumed operation time of the operation regarding the toilet cleaning is set as 10 minutes, it is determined that the sales clerk has performed the operation regarding the toilet cleaning, because the stay time is set as 12 minutes (from 1:04:00 to 1:16:00) in this example.

In the operation regarding the service (payment) at the cash register, the sales clerk operates a POS terminal (sales information management apparatus), and accordingly, it is possible to detect the operation regarding the service at the cash register, based on POS information. A motion model from the movement of the sales clerk when performing each operation is generated, the operation of the sales clerk obtained from the image and the motion model are compared to each other, and accordingly, it is possible to detect the operation of the sales clerk.

Figure 7:
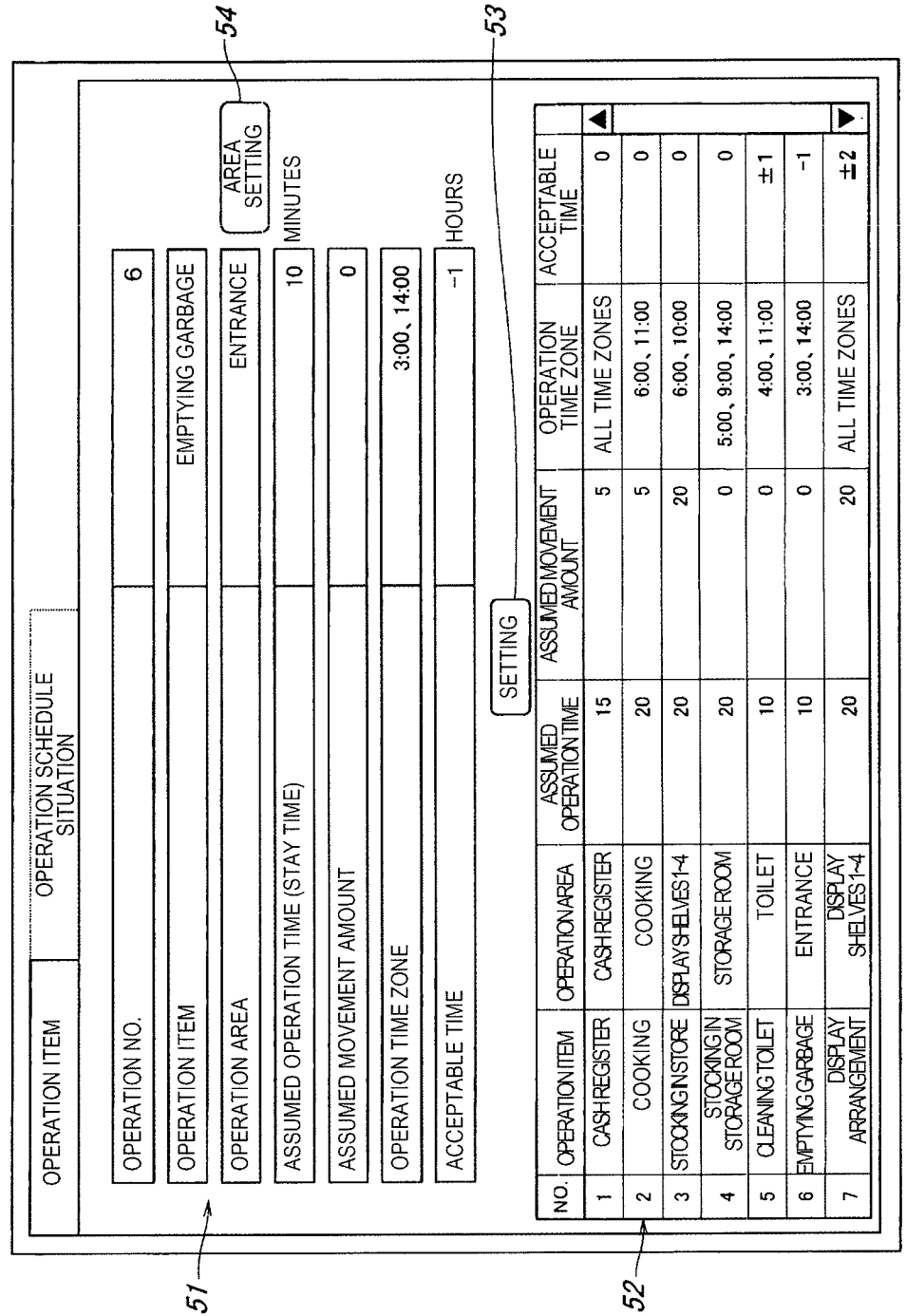
FIG. 7 is an explanatory diagram showing a set matter input screen displayed on monitor 12 of a head office.
Figure 8:
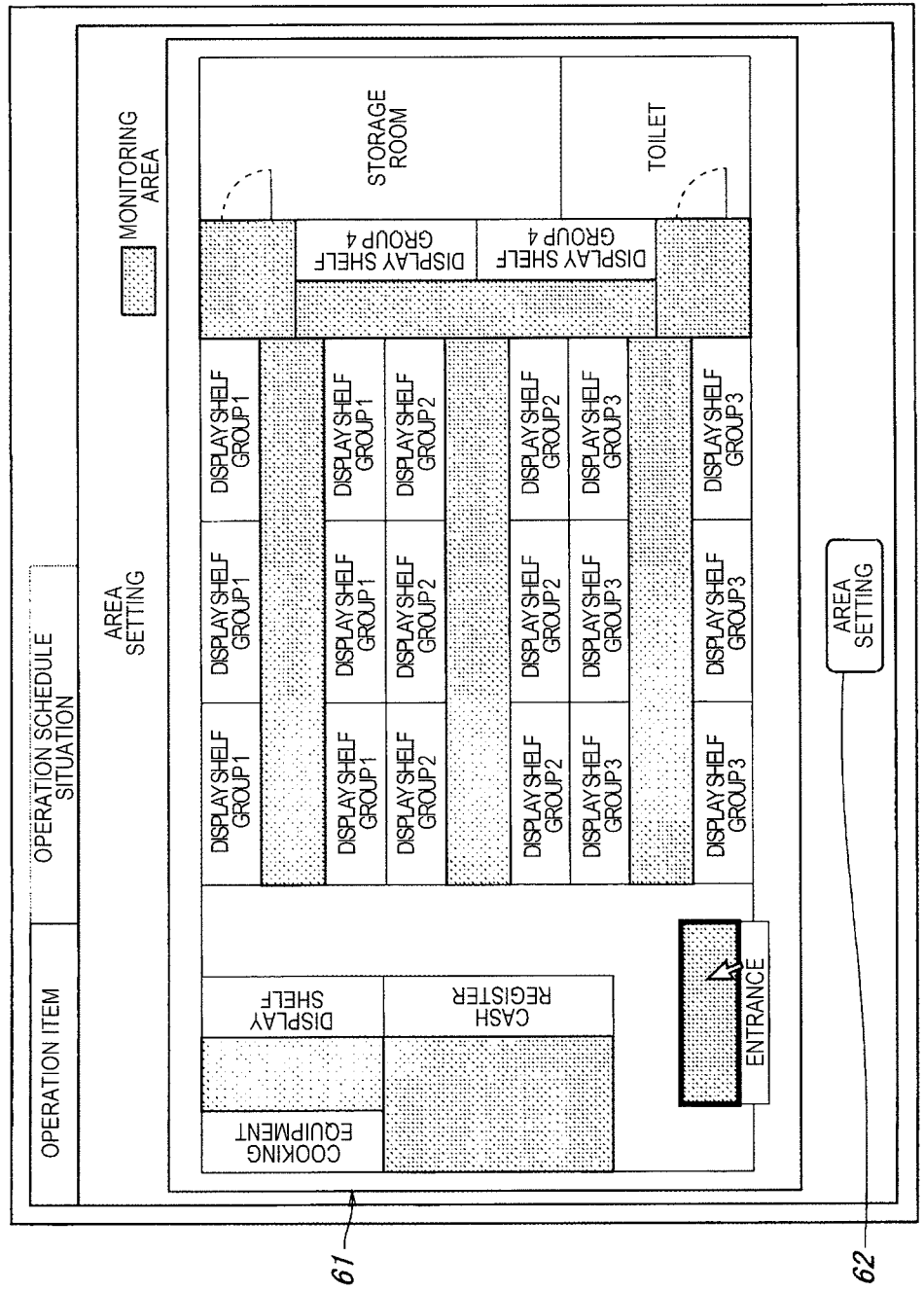
FIG. 8 is an explanatory diagram showing a monitoring area selection screen displayed on monitor 12 of a head office.

Next, the set matter input screen displayed on monitor 12 for inputting set matters from PC 11 of the head office shown in FIG. 1 will be described. FIG. 7 is an explanatory diagram showing the set matter input screen displayed on monitor 12. FIG. 8 is an explanatory diagram showing the monitoring area selection screen displayed on monitor 12.

The set matter input screen shown in FIG. 7 is for a user to input the set matters relating to the operation contents for each operation item and the operation schedule, and the set matter input screen includes set matter input part 51, set content display part 52, setting button 53, and area setting button 54.

Set matter input part 51 is provided with input columns of an operation number (NO.), an operation item, an operation area, an assumed operation time (stay time), and an assumed movement amount, as the set matters relating to the operation contents, and is provided with input columns of an operation time zone and an acceptable time, as the set matters relating to the operation schedule.

A serial number applied in the order of the operation items is input into the input column of the operation number (NO.). The title of the operation item is input into the input column of the operation item. The title of the operation area (monitoring area) is input into the input column of the operation area. Area setting button 54 is for displaying the monitoring area selection screen shown in FIG. 8. The titles of the operation item and the operation area may be previously registered to correspond to the monitoring area to be selected on the monitoring area selection screen, and may be automatically input by selecting the monitoring area.

The assumed operation time and the assumed movement amount which are threshold values obtained when it is determined whether or not the sales clerk has performed the operation based on the stay time and the movement amount by operation detector 33, are input into the input columns of the assumed operation time and the assumed movement amount.

The time zone for executing the operation is input into the input column of the operation time zone. The entire time zones may be designated or the plurality of time zones may be input into the input column of the operation time zone. For example, in the operation regarding the service at the cash register or the display arrangement, the entire time zones are designated. In the operation regarding the cooking or the stocking in the store, the time zone immediately before the peak time (for example, 6:00 and 11:00) is set. The starting time is displayed on the screen, and the selection of the time zone in the unit of 1 hour or in the unit of 10 minutes may be selected using a pop-up screen or the like.

The acceptable time when evaluating the execution situation of the operation by execution situation evaluator 41 is input into the input column of the acceptable time.

Set content display part 52 displays the contents input into set matter input part 51 as a list. Setting button 53 causes operation content setter 35 and operation schedule setter 36 to execute the setting process based on the information input into set matter input part 51. When the input of one operation item is completed in set matter input part 51 and set button 53 is operated, a process of setting the operation contents is performed in operation content setter 35, a process of setting the operation schedule is performed in operation schedule setter 36, and the set contents are displayed on set content display part 52.

The monitoring area selection screen shown in FIG. 8 is for a user to select the monitoring area for each operation item, and the monitoring area selection screen is provided with monitoring area display selection part 61 and area setting button 62.

Candidates of the monitoring areas on a layout drawing of the store are displayed on monitoring area display selection part 61, and it is possible to perform the operation of selecting any one of the candidates of the monitoring areas, using input device 13 such as a mouse. The example shown in FIG. 8 is a case of the operation regarding the emptying the garbage, and the monitoring area set on the selling area side of the entrance of the store is selected. When the monitoring area is selected in monitoring area display selection part 61 and area setting button 62 is operated, the screen returns to the set matter input screen shown in FIG. 7.

In the embodiment, the set matter input screen shown in FIG. 7 and the monitoring area selection screen shown in FIG. 8 are displayed on monitor 12 of the head office, and therefore, it is possible for a user on the head office side such as a supervisor to perform the input operation, but these screens may be displayed on monitor 4 of the store and a user on the store side such as a store manager or a sales clerk may perform the input operation.

Figure 9:
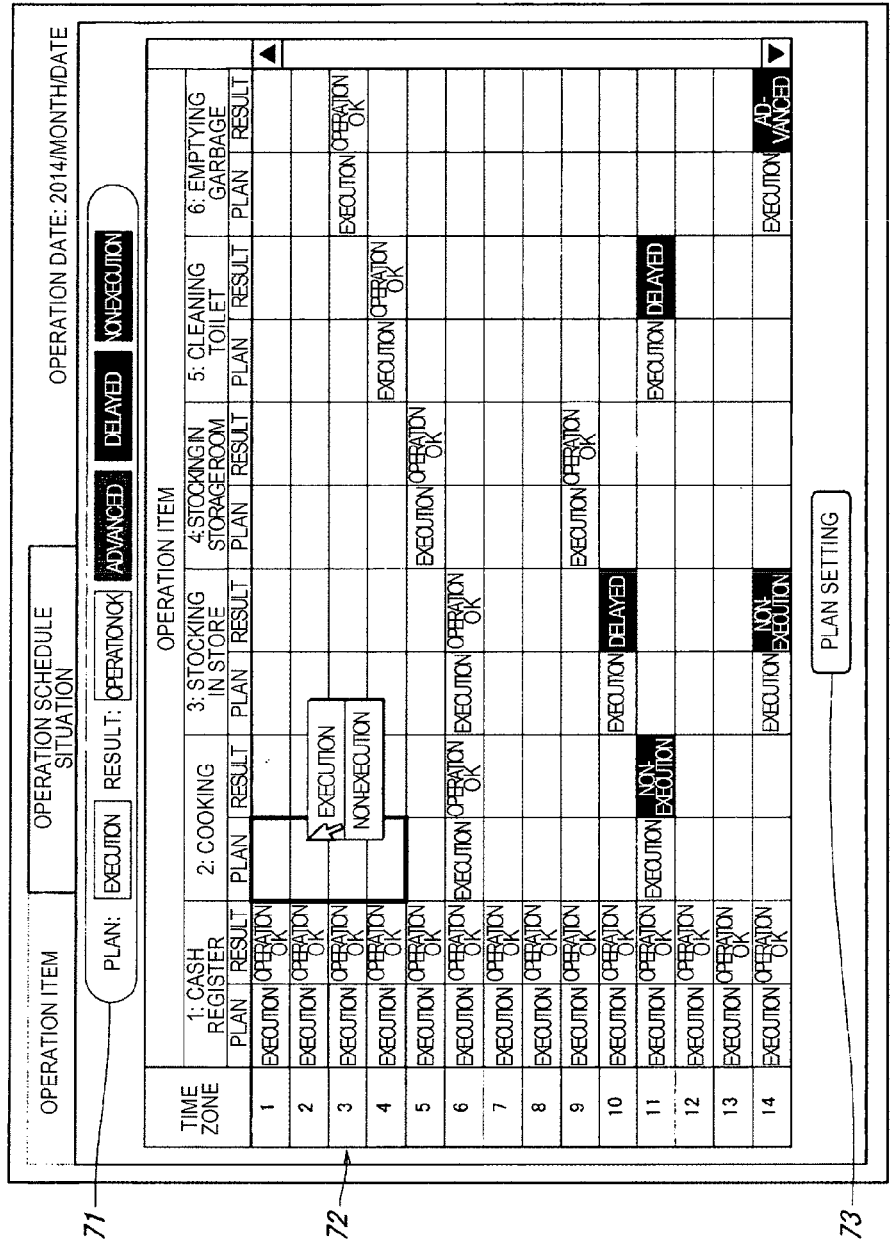
FIG. 9 is an explanatory diagram showing an overall check display screen displayed on monitor 12 of a head office.
Figure 10:
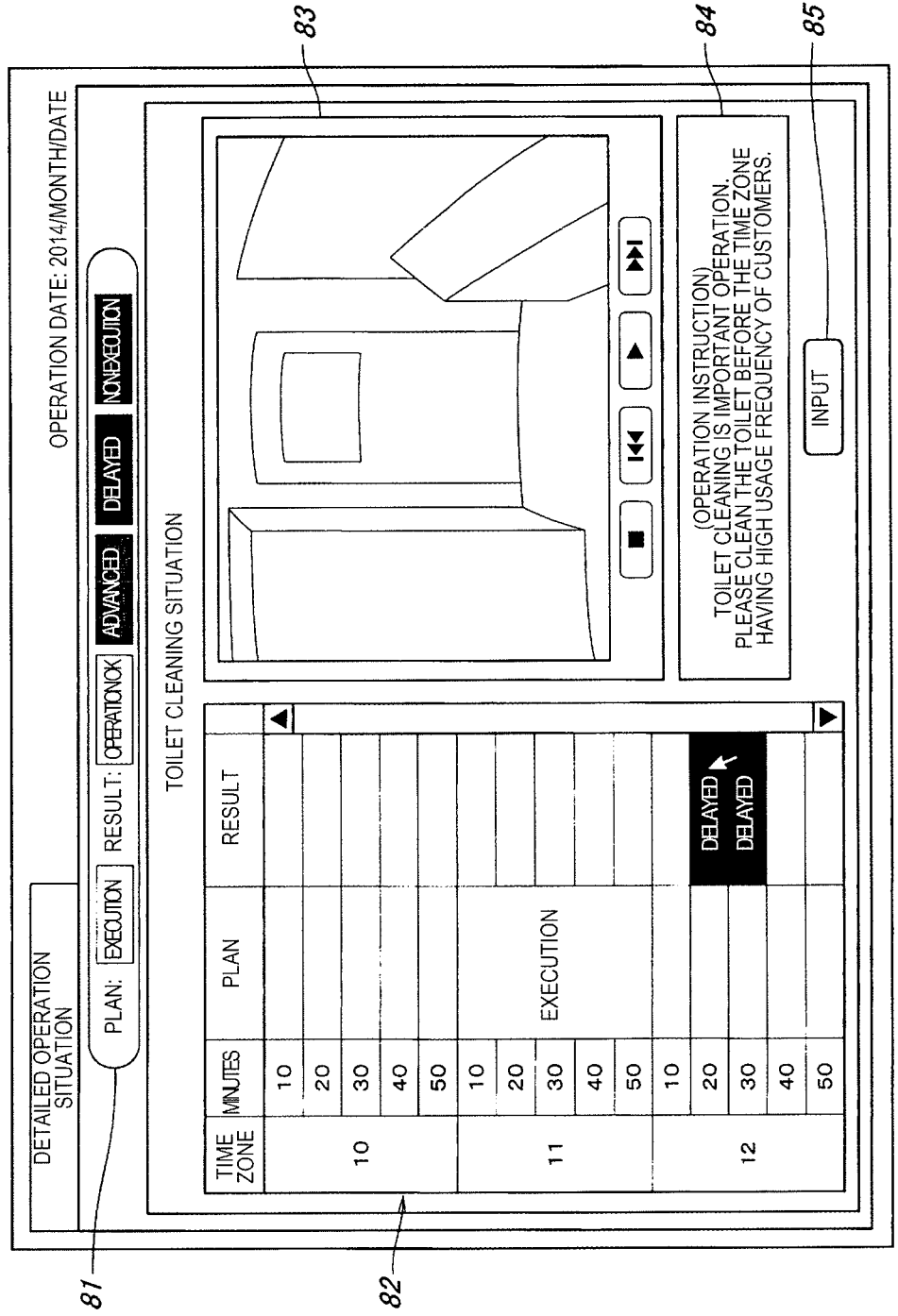
FIG. 10 is an explanatory diagram showing a detail display screen displayed on monitor 12 of a head office.
Figure 11:
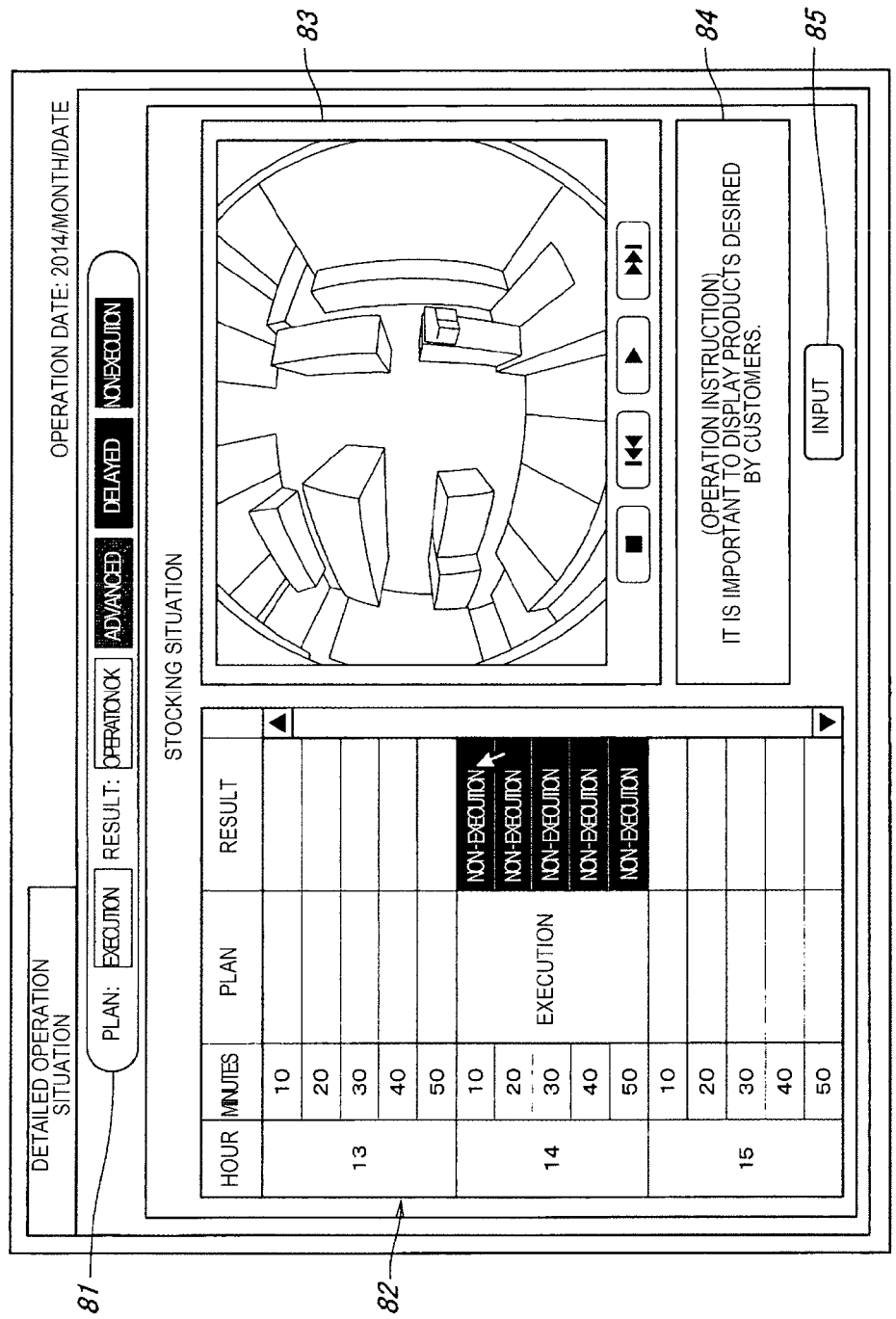
FIG. 11 is an explanatory diagram showing a detail display screen displayed on monitor 12 of a head office.

Next, the execution situation checking screen displayed on monitor 12 of the head office for a user on the head office side such as a supervisor to check the execution situation of the operation performed by the sales clerk, will be described. FIG. 9 is an explanatory diagram showing the overall check display screen displayed on monitor 12 of the head office. FIGS. 10 and 11 are explanatory diagrams showing a detail display screen displayed on monitor 12 of the head office.

The overall check display screen shown in FIG. 9 displays the execution situations of the operations in the target period as a list, and the overall check display screen is provided with explanatory note display part 71, list display part 72, and plan setting button 73.

A list showing the execution situations of the operations in the target period is displayed in list display part 72. In this list, the operation day which is the target period is divided into the time zones, and displayed for each operation item so as to compare the execution situation of the operation for each time zone with the operation schedule. That is, this list is provided with a plan column and a result column for each operation item. The operation schedule is displayed in the plan column, the execution situation of the operation is displayed in the result column, and it is possible to check the execution situation of the operation by comparison with the operation schedule.

Specifically, in the plan column, a term "execution" is displayed in a cell corresponding to each operation condition set so as to execute the operation in the operation schedule. In the result column, terms showing the evaluation results relating to the execution situations of the operations for each operation condition displayed in the plan column, that is, terms of "operation OK", "advanced", "delayed", and "non-execution" are displayed.

Explanatory note display part 71 is for describing highlighting (coloring) performed in each cell of the list of list display part 72.

It is possible to change the operation schedule in the overall check display screen. Specifically, first, when the range of the corresponding cell is selected and right-clicked according to the changed contents (operation item and time zone) of the operation schedule, options of "to execute" or "not to execute" are displayed, and when any one of these is selected, the display of the corresponding cell is changed to the selected contents.

As described above, when the operation of changing the operation schedule is performed and plan setting button 73 is operated, a process of updating the operation schedule is performed in operation schedule setter 36, and this is applied to the subsequent processes.

As described above, since it is possible to change the operation schedule in the overall check display screen which displays the execution situations of the operations as a list, it is possible to simply correct the operation schedule while watching the execution situations of the operations.

The detail display screen shown in FIGS. 10 and 11 displays the execution situations of the operations in detail, and the detail display screen is provided with explanatory note display part 81, list display part 82, image display part 83, comment input part 84, and input button 85.

The detail display screen is displayed by an operation (clicking of a mouse) of selecting one cell in list display part 72 of the overall check display screen shown in FIG. 9, the detail display screen shown in FIG. 10 is displayed in a case where a cell with a display of "delayed" is selected in the operation item of the toilet cleaning in the overall check display screen shown in FIG. 9, and the detail display screen shown in FIG. 11 is displayed in a case where a cell with a display of "non-execution" is selected in the operation item of the stocking in the store in the overall check display screen shown in FIG. 9.

In list display part 82 of the detail display screen shown in FIGS. 10 and 11, a list showing the specific execution situations of the operations relating to the operation item and the time zone corresponding to the cell selected in list display part 72 of FIG. 9 is displayed. In the same manner as that of the overall check display screen shown in FIG. 9, this list is provided with a plan column and a result column, the operation schedule is displayed in the plan column, the execution situation of the operation is displayed in the result column, and it is possible to check the execution situation of the operation by comparison with the operation schedule. The execution situations of the operations are displayed in the unit of 1 hour in list display part 72 of FIG. 9, the execution situations of the operations are displayed in the unit of 10 minutes in list display part 82 of FIGS. 10 and 11, and it is possible for a user to specifically grasp the time zone when the sales clerk has performed the operation.

When an operation (clicking of a mouse) of selecting one cell is performed in list display part 82 of FIGS. 10 and 11, the image in the time zone corresponding to the selected cell is displayed in image display part 83. Herein, the execution situations of the operations are displayed in list display part 82 in the unit of the time zone which is shorter than that of list display part 72 of the overall check display screen shown in FIG. 9. That is, list display part 82 of FIGS. 10 and 11 is displayed in the unit of 10 minutes, whereas list display unit 72 of FIG. 9 is displayed in the unit of 1 hour. It is possible to display the images by separating in short time zones, and therefore, it is possible to rapidly find the image in which the sales clerk is displayed.

Particularly, the example shown in FIG. 10 is the case where the cell with a display of "delayed" is selected in list display part 82, and in this case, it is considered that the sales clerk is displayed in the image of the monitoring area corresponding to the operation item (herein, operation regarding toilet cleaning), and accordingly, the image of the monitoring area is displayed in image display part 83. Herein, when the sales clerk has actually performed the operation regarding the toilet cleaning, the situations of the sales clerk entering the toilet from the entrance and exiting the toilet after that are imaged in the image displayed in image display part 83, and therefore, it is possible to check whether or not the sales clerk has actually performed the operation regarding the toilet cleaning.

Even when the evaluation result is the "advanced", it is considered that the sales clerk has actually performed the operation and thus is displayed in the image of the monitoring area, in the same manner as in the case of the "delayed". Accordingly, when the cell with a display of the "advanced" is selected in list display part 82, the image of the monitoring area corresponding to the operation item is displayed. Herein, a customer may be displayed in the image of the monitoring area, but in this case, it is desirable to display the image in a manner which protects privacy of the customer. For example, it is preferable to delete the person who is confirmed as a person other than the sales clerk or to perform a mosaic process on an image of the face of a person who is confirmed as a person other than the sales clerk, so that the individual persons are not specified. When the person who is confirmed as a person other than the sales clerk is deleted, only the sales clerks are in the image, and it is advantageous to easily grasp the execution situations of the operation of the sales clerk.

Meanwhile, the detail display screen shown in FIG. 11 is a case where the cell with a display of "non-execution" is selected in list display part 82, and in this case, it is considered that the sales clerk is not displayed in the image of the monitoring area corresponding to the operation item (herein, operation regarding the stocking in the store), and accordingly, there is no point in displaying the image of the monitoring area. Here, the image of the entire store is displayed in image display part 83. Therefore, it is possible to check what the sales clerk has done in the time zone set in the operation schedule.

In the example shown in FIG. 11, the image with the entire store imaged by one camera 1 (omnidirectional camera) is displayed, but in a case where there is no image with the entire store, the images of the plurality of cameras 1 may be subsequently switched and displayed, or the images of the plurality of cameras 1 may be displayed and the image of one camera 1 may be selected from the images and displayed.

In the detail display screen shown in FIGS. 10 and 11, when a cell with a display of "execution" is selected in the plan column, the image in the time zone corresponding to the selected cell may be displayed. In this case, when there is no display of "execution" in the cell of the result column, it is considered that the sales clerk has not been in the monitoring area in the corresponding time zone. Therefore, since there is no point in displaying the image of the monitoring area, the image of the entire store is displayed in image display part 83. Thus, it is possible to grasp a reason that the sales clerk could not execute the operation in the time zone set in the operation schedule.

A user inputs a comment into comment input part 84 to indicate and instruct the improvement matters to a user on the store side such as a store manager or a sales clerk, using input device 13 such as a keyboard. Since a user on the head office side such as a supervisor checks the execution situation of the operation by list display part 82 and watches the image displayed in image display part 83, it is possible to check whether or not the sales clerk has actually performed the operation and a user inputs the comment based on this. In the example shown in FIG. 10, "delayed" is shown for the operation regarding the toilet cleaning, and a user inputs a comment to instruct so as to perform the operation regarding the toilet cleaning at the designated timing. In the example shown in FIG. 11, since "non-execution" is shown for the operation regarding the stocking in the store, a user inputs a comment to instruct so as to actually execute the operation regarding the stocking in the store.

When the comment is input into comment input part 82 and input button 85 is operated, the comment is transmitted to PC 3 of the store, the screen with the comment displayed is displayed on monitor 4, and accordingly, a user on the store side such as a store manager or a sales clerk can browse the comment.

In the embodiment, the overall check display screen shown in FIG. 9 and detail display screen shown in FIGS. 10 and 11 are displayed on monitor 12 of the head office, and accordingly, a user on the head office side such as a supervisor can browse or perform an input operation. However, these screens may be displayed on monitor 4 of the store, and a user on the store side such as a store manager or a sales clerk may browse and perform an input operation.

Figure 12:
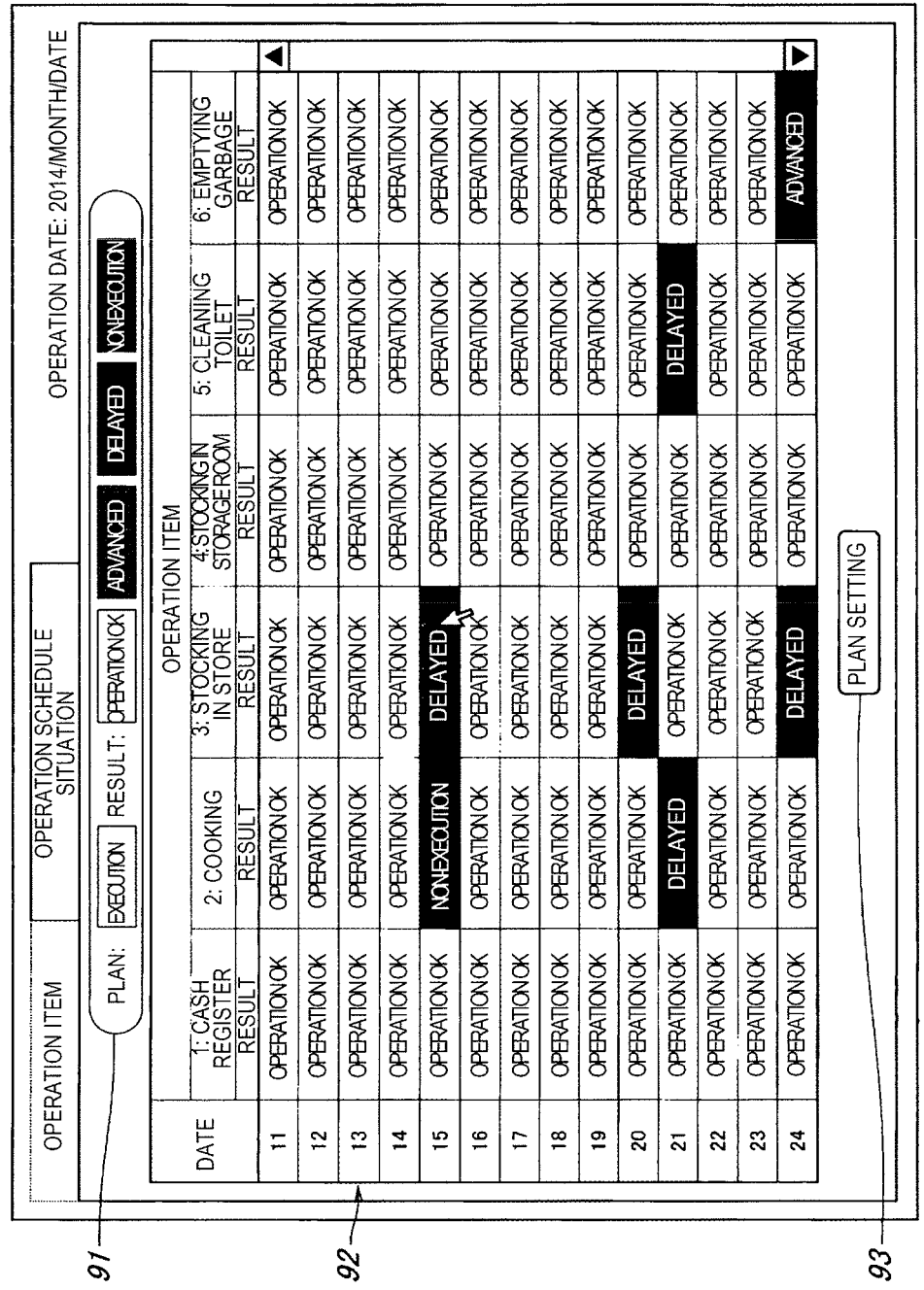
FIG. 12 is an explanatory diagram showing an overall check display screen displayed on monitor 12 of a head office.
Figure 13:
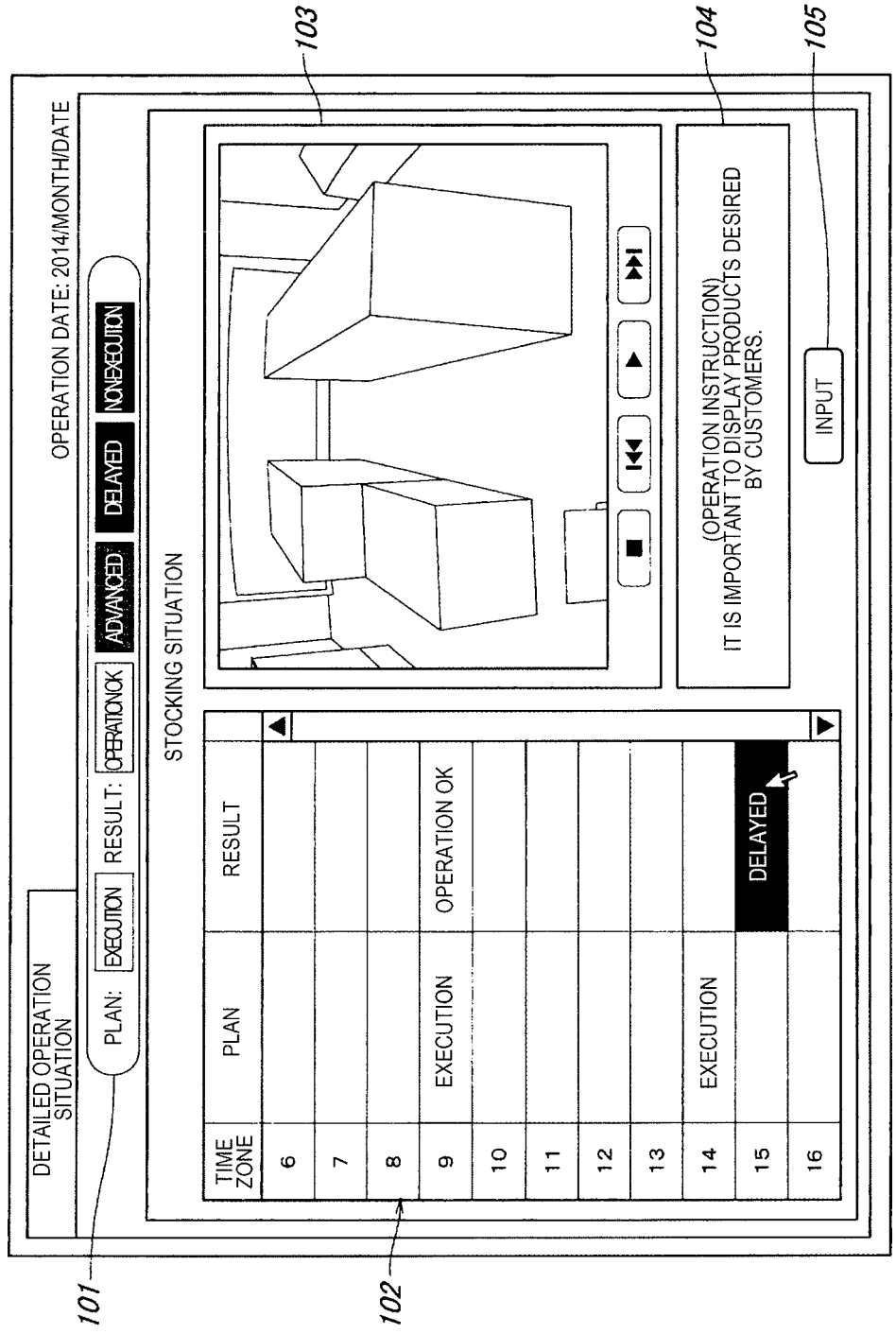
FIG. 13 is an explanatory diagram showing a detail display screen displayed on monitor 12 of a head office.

Next, the execution situation checking screen to be displayed on monitor 12 of the head office for a user on the head office side such as a supervisor to check the execution situation for each total unit period (for example, a day, a week, and a month) in the target period, will be described. FIG. 12 is an explanatory diagram showing the overall check display screen displayed on monitor 12 of the head office. FIG. 13 is an explanatory diagram showing the detail display screen displayed on monitor 12 of the head office.

The overall check display screen shown in FIG. 12 displays the execution situations of the operations in an operation month which is the target period as a list, and this overall check display screen is provided with explanatory note display part 91, list display part 92, and plan setting button 93.

A list showing the execution situations of the operations in the target period is displayed in list display part 92. In this list, the target period is set as one month, the total unit period is set as one day, and the execution situation of the operation for a day of a month is displayed for each operation item. In the same manner as that of the overall check display screen shown in FIG. 9, this list is provided with a plan column and a result column. The operation schedule is displayed in the plan column, the execution situation of the operation is displayed in the result column, and it is possible to check the execution situation of the operation by comparison with the operation schedule.

In this case, totalizer 42 performs a process of obtaining the daily evaluation result of the operation in the total unit period from the evaluation result for each operation condition, and the daily evaluation result of the operation is displayed on list display part 92. The order of priority is applied to the evaluation results (operation OK, advanced, delayed, and non-execution) in the order of a high degree of unsuitability, that is, in order of non-execution, delayed, advanced, and operation OK. The evaluation result having the highest order of priority among the evaluation results for each of the plurality of operation conditions in one day is set as the evaluation result of the day.

For example, when all of the operation conditions of a certain operation item in one day are executed appropriately, "operation OK" is displayed the corresponding cell. When at least one time of "advanced", "delayed", or "execution" has occurred among all of the operation conditions of a certain operation item in one day, a term showing the evaluation result having the highest order of priority among the "advanced", "delayed", or "execution" is displayed in the corresponding cell.

In the example shown in FIG. 12, the target period is set as one month, and the daily evaluation result of the operation month is displayed, but the target period may be set as one week, and the daily evaluation result of one week may be displayed.

The detail display screen shown in FIG. 13 displays the execution situations of the operations in detail, and the detail display screen is provided with explanatory note display part 101, list display part 102, image display part 103, comment input part 104, and input button 105, in the same manner as that of the detail display screen shown in FIGS. 10 and 11.

The detail display screen is displayed by an operation (clicking of a mouse) of selecting one cell in list display part 92 of the overall check display screen shown in FIG. 12, and a list showing the specific execution situations of the operations relating to the day and the operation item corresponding to the selected cell is displayed on list display part 102 of FIG. 13. In the same manner as that of the overall check display screen shown in FIG. 12, this list is provided with a plan column and a result column, the operation schedule is displayed in the plan column, the execution situation of the operation is displayed in the result column, and it is possible to check the execution situation of the operation by comparison with the operation schedule. The execution situations of the operations are displayed in the unit of the day in list display part 92 of FIG. 12, but the execution situations of the operations of the operation day are displayed in the unit of the time zone in list display part 102 of FIG. 13, and it is possible for a user to specifically grasp the timing when the sales clerk has performed the operation.

When an operation (clicking of a mouse) of selecting one cell is performed in list display part 102 of FIG. 12, the image in the time zone corresponding to the selected cell is displayed in image display part 103. The example shown in FIG. 13 is the case where the cell with a display of "delayed" is selected in list display part 102, and in this case, the image of the monitoring area corresponding to the operation item (herein, operation regarding the stocking in the store) is displayed, in the same manner as in the example shown in FIG. 10.

When the cell with a display of the "advanced" is selected in list display part 102, the image of the monitoring area corresponding to the operation item is displayed on image display part 103, in the same manner as in the example shown in FIG. 13. When the cell with a display of the "non-execution" is selected in list display part 102, the image of the entire store is displayed on image display part 103, in the same manner as in the example shown in FIG. 11.

A user inputs a comment into comment input part 104 to indicate and instruct the improvement matters to a user on the store side such as a store manager or a sales clerk, using input device 13 such as a keyboard, in the same manner as that of comment input part 84 shown in FIGS. 10 and 11. In the example shown in FIG. 13, since the operation regarding the stocking in the store is delayed, a user inputs the comment of instruction relating to the operation regarding the stocking in the store.

When the comment is input into comment input part 104 and input button 105 is operated, the comment is transmitted to PC 3 of the store, the screen with the comment displayed is displayed on monitor 4, and accordingly, a user on the store side such as a store manager or a sales clerk can browse the comment.

In the embodiment, the overall check display screen shown in FIG. 12 and detail display screen shown in FIG. 13 are displayed on monitor 12 of the head office, and accordingly, a user on the head office side such as a supervisor can browse the image. However, these screens may be displayed on monitor 4 of the store, and a user on the store side such as a store manager or a sales clerk may browse and perform an input operation.

Figure 14:
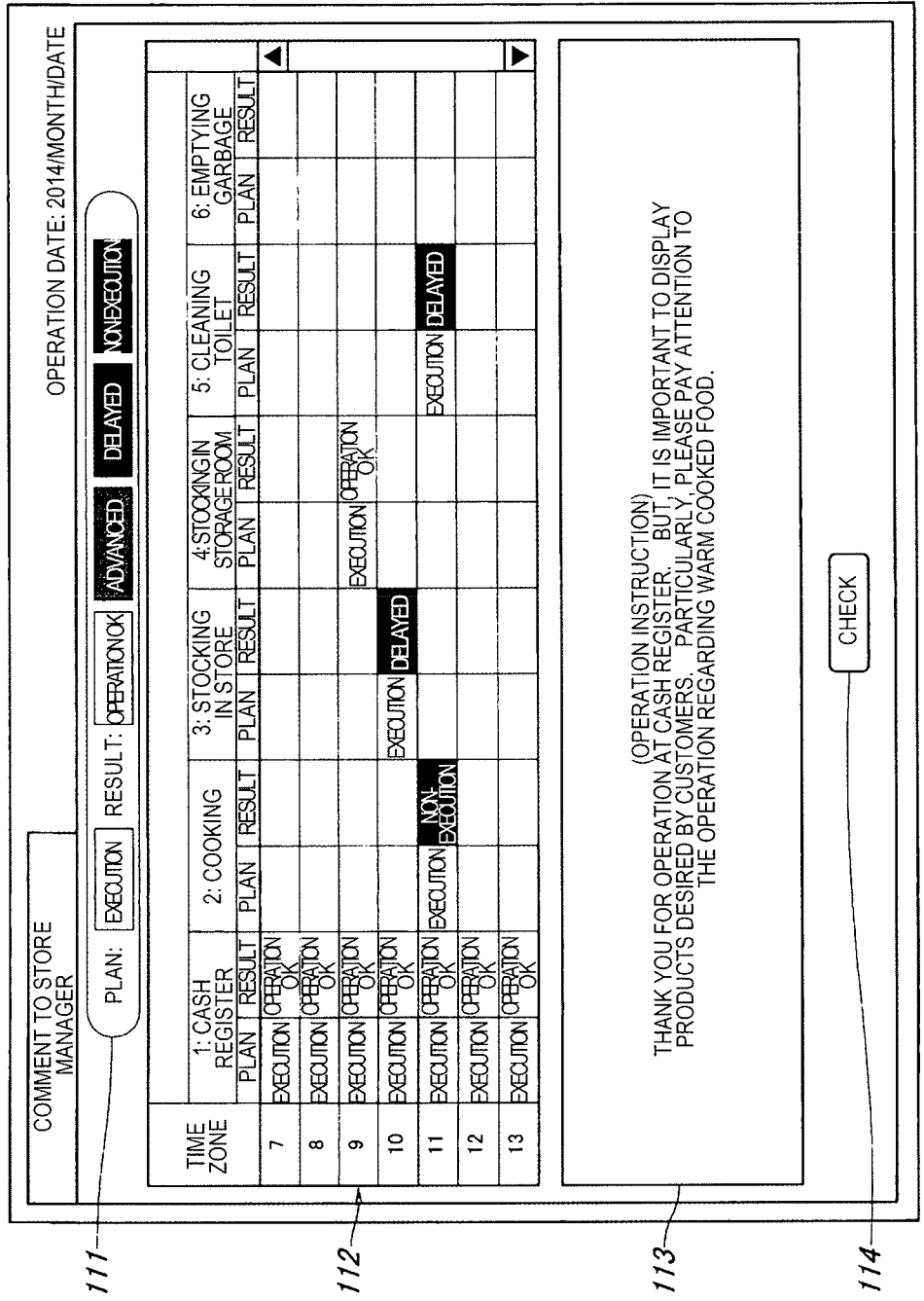
FIG. 14 is an explanatory diagram showing a comment notification screen displayed on monitor 4 of a store.

Next, a comment notification screen of notifying a user on the store side such as a store manager or a sales clerk of the comment for indicating and instructing the improvement matters from a user on the head office side such as a supervisor will be described. FIG. 14 is an explanatory diagram showing the comment notification screen displayed on monitor 4 of the store.

This comment notification screen displays the execution situations of the operations to a user on the store side and indicates and instructs the improvement matters. The comment notification screen is generated by sales clerk operation management unit 32 of PC 11 of the head office and is transmitted to PC 3 in the store and displayed on monitor 4 in the store, and a user on the store side such as a store manager or a sales clerk browses the screen. In PC 11 of the head office, an input screen having the same configuration as this comment notification screen is displayed on monitor 12, and a user on the head office side such as a supervisor inputs a comment.

The comment notification screen shown in FIG. 14 is provided with explanatory note display part 111, list display part 112, comment display part 113, and confirm button 114.

A list showing the execution situations of the operations in the target period is displayed in list display part 112. In this list, one day which is the target period is divided into the time zones, and displayed for each operation item so as to compare the execution situation of the operation for each time zone with the operation schedule, in the same manner as that of the overall check display screen shown in FIG. 9.

The evaluation of the operation executed appropriately and the comment for indicating and instructing the improvement matters are displayed in comment display part 113. In the example shown in FIG. 14, since the operation item of the stocking in the store is set as "delayed" and the operation item of the cooking is set as "non-execution", a comment of instructing so as to properly execute the operation regarding the stocking in the store and the operation regarding the cooking is displayed.

When a user on the store side such as a store manager or a sales clerk sees the comment displayed on comment display part 113 and operates confirm button 114, a notification that the comment notification screen is browsed is transmitted to PC 11 of the head office, and therefore, it is possible for a user on the head office side to grasp that a user on the store side has browsed the comment notification screen.

The comments input into comment input part 84 of the detail display screen shown in FIGS. 10 and 11 and comment input part 104 of the detail display screen shown in FIG. 13 may be displayed on the comment notification screen which is the same as the example shown in FIG. 14 on monitor 4 in the store, but list display part 112 shown in FIG. 14 may be omitted and only the comment may be displayed.

As described above, in the embodiment, since the display information (list display part 72, list display part 82, list display part 92, list display part 102, and list display part 112) shown so as to compare the information relating to the execution situations of the operations with the operation schedule is output, it is possible for a user to simply grasp whether or not the sales clerk has properly executed the operation according to the operation schedule.

In the embodiment, operation contents setter 35 sets the monitoring areas in the store for each operation item, operation detector 33 detects the sales clerks from the image of the monitoring areas and detects that the sales clerk has performed the operation, based on the stay situation of the sales clerk in the monitoring area. Since the operation areas where the sales clerk performs the operation may be different from each operation item in many cases, the monitoring area corresponding to the operation area is set for each operation item to obtain the stay situation of the sales clerk in the monitoring area, and accordingly, it is possible to detect that the sales clerk has performed the predetermined operation simply and with sufficient accuracy, without specific analysis of the behavior of the sales clerk.

In the embodiment, since operation contents setter 35 sets the monitoring area for each operation item, according to an input operation by a user which is selecting the monitoring area corresponding to the operation item among candidates of the preset monitoring areas, it is easy for a user to perform the operation when setting the monitoring area for each operation item and it is possible to increase convenience to a user.

In the embodiment, operation contents setter 35 sets the monitoring area in an access area with respect to the operation area, when the sales clerk performs the operation in an operation area which is not displayed in the image, and operation detector 33 detects that the sales clerk has performed the operation, based on the events of the sales clerk who disappears and returns to appear in the image obtained by imaging the monitoring area. Therefore, even when it is difficult to obtain the image of the operation area due to a reason that the operation area where the sales clerk performs the operation is not a selling area and it is desired to perform the monitoring without installing the camera or a reason that it is difficult to install the camera in the operation area, it is possible to detect that the sales clerk has performed the operation.

In the embodiment, screen information generator 44 generates and outputs list display information (list display part 72 and list display part 82) which displays the execution situation for each operation condition in a target period as a list, and outputs an image showing the operation situation of the sales clerk corresponding to the selected operation condition, according to the operation of a user who selects the operation condition of interest in the list display information. Accordingly, it is possible to briefly grasp the execution situation of the operation by the list display information. For the operation conditions of interest, it is possible to check the actual operation situation of the sales clerk with the image. Accordingly, even when the accuracy of the operation detection process performed by operation detector 33 is low and an erroneous detection occurs, it is possible to accurately grasp the actual operation situation.

In the embodiment, screen information generator 44 outputs first list display information (list display part 72 and list display part 92 of overall check display screen) which displays the execution situation for each operation condition in the target period as a list by time zones, outputs second list display information (list display part 82 and list display part 102 of detail display screen) which displays the execution situation for each operation condition by time zones shorter than those of the first list display information as a list, and outputs the image corresponding to the selected operation condition, according to the operation of a user who selects the operation condition of interest in the second list display information. Accordingly, it is possible to display the images by separating in short time zones, and therefore, it is possible to effectively find the image in which the actual operation situation of the sales clerk is imaged.

In the embodiment, the execution situation checking screen (detail display screen) is provided with a comment input part 84 and comment input part 104 into which a user inputs a comment, and another user is notified of the comment input into comment input part 84 and comment input part 104. Accordingly, it is possible to transmit the comment from a user on the head office side such as a supervisor to a user on a store side such as a store manager or a sales clerk, and indicate and instruct the improvement matters. A user on the head office side can input the comment while checking the execution situation of the operation, it is possible to efficiently create an appropriate comment, and thus, it is possible to increase the convenience to a user.

In the embodiment, execution situation evaluator 41 performs evaluations regarding execution or non-execution of the operation and appropriateness of the execution timing, for each operation condition, by comparison to the detected results of operation detector 33 and the operation schedule. Accordingly, it is possible for a user to simply grasp the execution or non-execution of the operation and appropriateness of the execution timing.

In the embodiment, totalizer 42 totals the evaluation results (operation OK, advanced, delayed, and non-execution) for each operation condition obtained by execution situation evaluator 41, in each predetermined total unit period, and obtains the evaluation results in each total unit period. Accordingly, it is possible to immediately grasp the execution state of the operation in an arbitrary total unit period (for example, a day, a week, and a month).

In the embodiment, totalizer 42 obtains the evaluation result for each total unit period from the evaluation result for each operation condition, according to the order of priority in the order of a high degree of unsuitability, when the plurality of operation conditions are in the total unit period. Accordingly, the evaluation result of the operation condition having the worst problem among the plurality of operation conditions in one total unit period is set as the evaluation result in the total unit period, and therefore, it is possible to rapidly grasp the period having a problem.

Hereinabove, the invention has been described based on the specific embodiment, but the embodiments are merely examples, and the invention is not limited to the embodiments. Not all of constituent elements of the sales clerk operation management apparatus, the sales clerk operation management system, and the sales clerk operation management method according to the invention shown in the embodiments are necessary, and it is possible to appropriately remove and delete the constituent elements in a range of not departing from the scope of the invention.

For example, in the embodiment, the example of a retail store such as a convenience store has been described, but there is no limitation to the retail store, and the invention can also be applied to a store with an operation format other than that of the retail store.

In the embodiment, the operation schedule is determined by setting the timing (time zone) for executing the operation in the unit of 1 hour, but this timing for executing the operation may be determined in the unit of the period shorter than 1 hour, for example, 10 minutes, or the timing for executing the operation may be determined in the unit of the period longer than 1 hour, for example, a day, that is, the time point for the execution may not be determined and only the number of times of executing the operation in a day may be determined.

In the embodiment, as shown in FIG. 8, when setting the monitoring areas for each operation item, the candidates of the monitoring areas are displayed on the monitoring area selection screen so as to make a user select the monitoring area, but a user can freely input the monitoring area on a layout drawing of the store using input device 13 such as a mouse. In this case, for example, when setting monitoring area in a polygonal shape, an apex of the monitoring area may be input using input device 13. A line indicating outer periphery of the monitoring area may be drawn by a mouse and the monitoring area may be set by the trajectory of the mouse.

In the embodiment, as shown in FIGS. 10, 11, and 13, the image is output in order to check the actual situations of the sales clerk, and this image may be any one of a moving image and a still image, and a voice obtained by a microphone installed in the store may be output.

In the embodiment, the example of the operation schedule is shown, but this operation schedule may be set for each sales clerk. Accordingly, it is possible to set the operation schedule according to a level of skill of the sales clerk. In this case, operation detector 33 may identify the sales clerk by human recognition. In addition, the operation schedule may be set to be different each day.

In the embodiment, operation detector 33 is provided in PC 11 for performing the sales clerk operation management, but a part of the functions of this operation detection, for example, a function of the person detection, can be configured with another device or can be integrated with camera 1 so as to be configured as a person detection function-attached imaging device.

In the embodiment, the process necessary for the sales clerk operation management is performed in PC 11 provided in the head office, but the necessary process may be performed in PC 3 provided in the store or in a cloud computer 21 configuring a cloud computing system, as shown in FIG. 1. The necessary process may be shared by a plurality of information processing apparatuses, and information may be transmitted to and received from the plurality of information processing apparatuses through a communication medium such as an IP network or a LAN. In this case, the sales clerk operation management system is configured with the plurality of information processing apparatuses sharing the necessary process.

In the configurations described above, among the processes necessary for the sales clerk operation management, at least a process having a large operation amount, for example, the operation detection process, may be performed by a device provided in the head office. By configuring as described above, since the amount of data of necessary information in the remaining processes is small, accordingly, even when the remaining processes are caused to perform by an information processing apparatus installed in another place, it is possible to decrease a communication load, and therefore, it is easy to operate the system by broad area network connection configuration.

Among the processes necessary for the sales clerk operation management, at least a process having a large operation amount, for example, the operation detection process, may be performed by cloud computer 21. By configuring as described above, since an operation amount of the remaining process is small, a high-speed information processing apparatus is not necessary on the user side such as a store, and it is possible to reduce cost shouldered by a user.

Cloud computer 21 may perform all of the necessary processes or at least the display information generation process among the necessary processes may be shared by cloud computer 21. By configuring as described above, in addition to PC 3 and PC 11 provided in the store or the head office, it is also possible to display the display information (such as overall check display screen) on a portable terminal such as smart phone 22 or tablet terminal 23, and therefore, it is possible to check the execution situations of the operations performed by the sales clerk in an arbitrary place such as places other than the store or the head office.

In the embodiment, PC 11 installed in the head office performs the process necessary for the sales clerk operation management, and the display information (such as overall check display screen) generated by PC 11 is browsed on monitor 12 of PC 11 or monitor 4 of PC 3 installed in the store, but a browsing device of the display information can be provided separately from PC 3 and PC 11, for example, the portable terminal such as smart phone 22 or tablet terminal 23 can be set as the browsing device of the display information as described above, or a function as the browsing device of the display information can be added to the sales information management apparatus installed in the store. The display information can also be output using a printer.

In the embodiment, PC 11 installed in the head office performs the process necessary for the sales clerk operation management and the necessary input operation such as input of the set matters are performed by PC 11, but the necessary input operation may be performed by PC 3 installed in the store, or the necessary input operation may be performed by the information processing apparatus other than PC 3 and PC 11, for example, the portable terminal such as tablet terminal 23.

The sales clerk operation management apparatus, the sales clerk operation management system, and the sales clerk operation management method according to the invention have an effect of allowing a user to simply grasp whether or not the sales clerk appropriately performs the operation according to the operation schedule, and are useful as a sales clerk operation management apparatus, a sales clerk operation management system, and a sales clerk operation management method which manage the execution situations of the operation performed by the sales clerk, based on the image obtained by imaging the inside of the store.

What is claimed is:

1. A sales clerk operation management apparatus which manages execution situations of operations performed by a sales clerk based on a plurality of images obtained by imaging an inside of a store, the sales clerk operation management apparatus comprising:
    a processor;
    a display; and
    a memory which includes instructions that, when executed by the processor, cause the processor to perform operations including:
    displaying, on the display, operation contents of each operation to be executed by the sales clerk, each operation being displayed on the display in association with one of the plurality of images;
    displaying, on the display, an operation schedule relating to each operation to be executed by the sales clerk;
    detecting whether the sales clerk has performed each operation, based on associated image of the plurality of images;
    generating information relating to the execution situations for each operation, based on a result of the detecting;
    displaying, on the display, the information relating to the execution situations for each operation in comparison with the operation schedule;
    generating list display information which displays the execution situations for each operation in a target period as a list; and
    displaying, on the display, an image with the execution situations of the sales clerk corresponding to a selected operation condition, according to an operation by a user of selecting the operation in the list display information,
    wherein the associated image for at least one operation is of an access area adjacent to an area in which the at least one operation is to be performed.

2. The sales clerk operation management apparatus of claim 1, wherein the operations further include:
    generating first list display information which displays the execution situations for each operation in the target period as a list by time zones;
    generating second list display information which displays the execution situations for each operation by time zones shorter than those of the first list display information as a list; and
    displaying the image corresponding to the selected operation condition, according to the operation by the user of selecting the operation of interest in the second list display information.

3. A sales clerk operation management system which manages execution situations of operations performed by a sales clerk based on a plurality of images obtained by imaging an inside of a store, the sales clerk operation management system comprising:
    cameras which image the inside of the store; and
    a plurality of information processing apparatuses,
    wherein any one of the plurality of information processing apparatuses includes a processor, a display; and a memory which includes instructions that, when executed by the processor, cause the processor to perform operations including:
    displaying, on the display, operation contents of each operation to be executed by the sales clerk, each operation being displayed on the display in association with one of the plurality of images;
    displaying, on the display, an operation schedule relating to each operation to be executed by the sales clerk;
    detecting whether the sales clerk has performed each operation, based on associated image of the plurality of images;
    generating information relating to the execution situations for each operation, based on a result of the detecting;
    displaying, on the display, the information relating to the execution situations for each operation in comparison with the operation schedule;
    generating list display information which displays the execution situations for each operation in a target period as a list; and
    displaying, on the display, an image with the execution situations of the sales clerk corresponding to a selected operation condition, according to an operation by a user of selecting the operation in the list display information,
    wherein the associated image for at least one operation is of an access area adjacent to an area in which the at least one operation is to be performed.

4. A sales clerk operation management method which causes an information processing apparatus to perform a process of managing execution situations of operations performed by a sales clerk based on a plurality of images obtained by imaging an inside of a store, the sales clerk operation management method comprising:
    displaying, on the display, operation contents of each operation to be executed by the sales clerk, each operation being displayed on the display in association with one of the plurality of images;
    displaying, on the display, an operation schedule relating to each operation to be executed by the sales clerk;
    detecting whether the sales clerk has performed each operation, based on associated image of the plurality of images;
    generating information relating to the execution situations for each operation, based on a result of the detecting;
    displaying, on the display, the information relating to the execution situations for each operation in comparison with the operation schedule;
    generating list display information which displays the execution situations for each operation in a target period as a list; and
    displaying, on the display, an image with the execution situations of the sales clerk corresponding to a selected operation condition, according to an operation by a user of selecting the operation in the list display information,
    wherein the associated image for at least one operation is of an access area adjacent to an area in which the at least one operation is to be performed.

5. The sales clerk operation management system of claim 3, wherein the operations further include:
    generating first list display information which displays the execution situations for each operation in the target period as a list by time zones;
    generating second list display information which displays the execution situations for each operation by time zones shorter than those of the first list display information as a list; and
    displaying the image corresponding to the selected operation condition, according to the operation by the user of selecting the operation of interest in the second list display information.

6. The sales clerk operation management method of claim 4, wherein the operations further include:
- generating first list display information which displays the execution situations for each operation in the target period as a list by time zones;
- generating second list display information which displays the execution situations for each operation by time zones shorter than those of the first list display information as a list; and
- displaying the image corresponding to the selected operation condition, according to the operation by the user of selecting the operation of interest in the second list display information.

* * * * *